(12) United States Patent
Akiyama et al.

(10) Patent No.: US 7,369,163 B2
(45) Date of Patent: May 6, 2008

(54) IMAGE PROCESSING APPARATUS, IMAGE PROCESSING METHOD, AND PROGRAM USING CONDITION INFORMATION FOR IMAGE PROCESSING

(75) Inventors: Yuji Akiyama, Kanagawa (JP); Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 10/383,720

(22) Filed: Mar. 10, 2003

(65) Prior Publication Data
US 2003/0179298 A1 Sep. 25, 2003

(30) Foreign Application Priority Data
Mar. 20, 2002 (JP) .............................. 2002-078422
Jan. 21, 2003 (JP) .............................. 2003-012267

(51) Int. Cl.
*H04N 5/76* (2006.01)
(52) U.S. Cl. ............................... 348/231.3; 348/207.2; 348/222.1; 348/333.02
(58) Field of Classification Search ............ 348/231.3, 348/231.6, 716; 382/103
See application file for complete search history.

(56) References Cited
U.S. PATENT DOCUMENTS
6,707,950 B1 * 3/2004 Burns et al. ................. 382/254
6,839,064 B2 * 1/2005 Nakami ....................... 345/556
6,862,040 B1 * 3/2005 Sawachi ..................... 348/231.3
2002/0008762 A1 * 1/2002 Takemoto ..................... 348/223

FOREIGN PATENT DOCUMENTS
| JP | 11-032349 | 2/1999 |
|----|-----------|--------|
| JP | 11-066274 | 9/1999 |
| JP | 2000-244855 | 8/2000 |

OTHER PUBLICATIONS
U.S. Appl. No. 10/233,560, filed Sep. 4, 2002.
Japanese office action, Notification of Reason for Refusal in Japanese Patent Application No. 2003-012267 dated Dec. 12, 2006.

* cited by examiner

*Primary Examiner*—Ngoc-Yen Vu
*Assistant Examiner*—Adam L Henderson
(74) *Attorney, Agent, or Firm*—Fitzpatrick, Cella, Harper & Scinto

(57) ABSTRACT

An image processing apparatus performs image processing to image information including condition information at the time of obtaining an image for setting a pertinent image correction condition even at the time when the meaning of the description in the same condition item differs according to a description format or the version of the description format. The image processing apparatus includes a first analysis unit for analyzing the description format of the condition information, a second analysis unit for analyzing the condition information and a processing determination unit for determining the image processing to the image information on the basis of the analysis results of the first and the second analysis units.

24 Claims, 16 Drawing Sheets

FIG. 9
IMAGE CORRECTION SETTING
 AUTOMATIC IMAGE CORRECTION IS PERFORMED
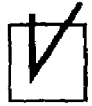 ONLY FILE OF VERSION 2 IS CORRECTED
 AUTOMATIC IMAGE CORRECTION IS NOT PERFORMED

IMAGE PROCESSING APPARATUS, IMAGE PROCESSING METHOD, AND PROGRAM USING CONDITION INFORMATION FOR IMAGE PROCESSING

BACKGROUND OF THE INVENTION

1. Field of the Invention

The present invention relates to an image processing apparatus, an image processing system, an image processing method, a computer readable recording medium storing a program for executing image processing, and the program for executing the image processing, all to be used in an apparatus or a system for executing image correction processing at the time of printing out digital image data obtained with, for example, a digital still camera or the like.

2. Related Background Art

In recent years, for example, digital still cameras have been spread. Consequently, it has become easy to digitize photography images. In particular, images having photographic tones have more frequently treated as digital image data on personal computers. Furthermore, it has become easier to process or edit the digital image data of the images having photographic tones on the personal computers by means of various kinds of application software.

On the other hand, full color hard techniques have also rapidly developed. In particular, in printing techniques using ink jet processes, a technique for decreasing granular feeling owing to ink dots has improved. Consequently, image qualities of printout results have become the same ones of film photos. Furthermore, the printing techniques are relatively simple techniques. Consequently, the printing techniques have been widely spread.

The background art described above urges to develop a technique making it possible to print out digital image data obtained by photography with a digital still camera easily. Furthermore, as for image correction processing at the time of printing out, automatic image correction processing has become necessary more and more for obtaining images always in good conditions after receiving an image correction by means of a piece of application software on a personal computer without operating complicated functions with hands for image correction processing.

Accordingly, various methods have proposed as methods for obtaining good printout results by outputting digital image data after performing image processing such as image correction processing or the like at the time of printing out. One of the methods is, for example, a method for performing image corrections automatically on the basis of the results of analyses of scenes of photography images.

Moreover, for example, methods for the so-called "density correction" have been proposed. The density correction is a kind of image corrections for preventing a photography image from being too bright (too pale) or too dark (too deep) when it is printed out. Furthermore, methods for the so-called "image correction" of a photography image have been proposed also. The so-called image correction is to correct images in which color balance is upset owing to color fogs, unsuitable exposures (in brightness or in contrast), unsuitable color saturation or the like.

Both image processing methods of the "density correction" and the "image correction" adopt a system for automatic image correction. The system analyzes an image to be processed (original image) using a histogram showing a cumulative number of pixels at every luminance value in the original image, and the system corrects the original image on the basis of the result of the analysis.

Moreover, as a function of a digital still camera, it is possible not only to record an image obtained by photography as digital image data in a storage medium such as a memory card or the like, but also to record additional information indicating photography conditions at the time of photography in the storage medium together with the digital image data.

Incidentally, if a scene of an image which is obtained by photography with a digital still camera and is to be an object of image processing (object image) is analyzed by performing the image analysis of the object image to perform the automatic image correction of the object image on the basis of the analysis result in accordance with the conventional image processing method described above, then the automatic image correction to print out images which are considered to be theoretically optimum (standard images) to all of the object images is basically performed.

However, the automatic image correction described above is different from a manual image correction in which a user manually corrects an object image on a personal computer using an application software while ascertaining the object image displayed on the monitor of the personal computer. Since the object image is corrected to be a standard image in the automatic image correction, the corrected image is sometimes different from the intention of the user at the time of obtaining the object image (at the time of photography).

For example, an image obtained under an exposure condition which was intentionally set to be brighter or darker by the user will be output as an image having normal brightness by being corrected to be darker to a brighter image or to be brighter to a darker image. That is, the automatic image correction method corrects any object image to be an image having the same brightness to output it independently of the image quality of the object image.

Moreover, if a user photographs a subject with a digital still camera the white balance of which is intentionally changed with a user's intention of obtaining a specific effect, then the automatic image correction method corrects the photography image to have the optimum color balance similarly.

On the other hand, a digital still camera has a photography mode function to make the photography conditions of the camera be the optimum to a photography scene. If the information of a photography scene, for example, the information concerning which the scene is a scenery or a person, is previously known when an image correction condition is determined correspondingly to the photography mode, then it is considerable that a correction to be a more accurate and preferable image can be realized.

However, since it is impossible to conclude what the photography scene surely is on the basis of the analysis result of an object image obtained by photography, a user has conventionally be obliged to execute the automatic image correction by weakening the correction effect of the correction for preventing the occurrence of harmful influences in a corrected image actually.

Moreover, digital still cameras have improved in their functions in recent years. For example, some of them have such specific effect functions as heighten the color saturation of an image obtained by photography or as change the contrast or the brightness of the image. However, when automatic image correction processing is executed together with the execution of the specific effect functions, the specific effects to be produced by the specific effect functions are sometimes lost owing to the double corrections. In another case, the corrections of the specific effect functions become too strong to make the corrected image be deteriorated.

Accordingly, the inventors of the present invention paid their attention to image data including image information to which a digital still camera added information indicating photography conditions at the time of obtaining the image information by photographing a predetermined scene, i.e. the information indicating various conditions at the time of obtaining the image information. And the inventors proposed a method for performing pertinent image correction processing to the image information by using the image data to analyze the added condition information and then to determine the optimum image correction condition.

However, pieces of condition information added into respective pieces of image data can be considered to have different description formats and different numbers of the items of the condition information correspondingly to the functional improvements of the pieces of condition information. Consequently, a method for judging the description formats and the numbers of the condition items to set a pertinent image correction processing condition is demanded. Moreover, even in the same condition item in a piece of condition information, it is considerable that the meaning of the contents described in the condition item also differs according to the description format or the version of the format. Consequently, a method for setting a pertinent image correction processing condition also in such a case is demanded.

SUMMARY OF THE INVENTION

The present invention is featured in settling all of or at least one of the aforesaid problems.

Moreover, another feature of the present invention is to perform satisfactory image processing of pieces of image data different in their description formats of pieces of condition information such as photography conditions and so forth, of pieces of image data different in their numbers of condition items of pieces of condition information to be described, and of pieces of image data different in the meanings of the description contents in the same condition item of condition information to be described.

For realizing the features described above, the present invention provides an image processing apparatus including a first analysis unit for analyzing the description format of the condition information, a second analysis unit for analyzing the condition information, and a processing determination unit for determining the image processing of the image data on a basis of analysis results of the first and the second analysis units.

Further features of the present invention will be clear by means of the following descriptions of the preferred embodiments and the attached drawings.

BRIEF DESCRIPTION OF THE DRAWINGS

FIG. 9 is a view showing a display example for executing image correction setting in the third embodiment;

DESCRIPTION OF THE PREFERRED EMBODIMENTS

In the following, the preferred embodiments of the present invention will be described by means of the attached drawings.

First Embodiment

Figure 1:
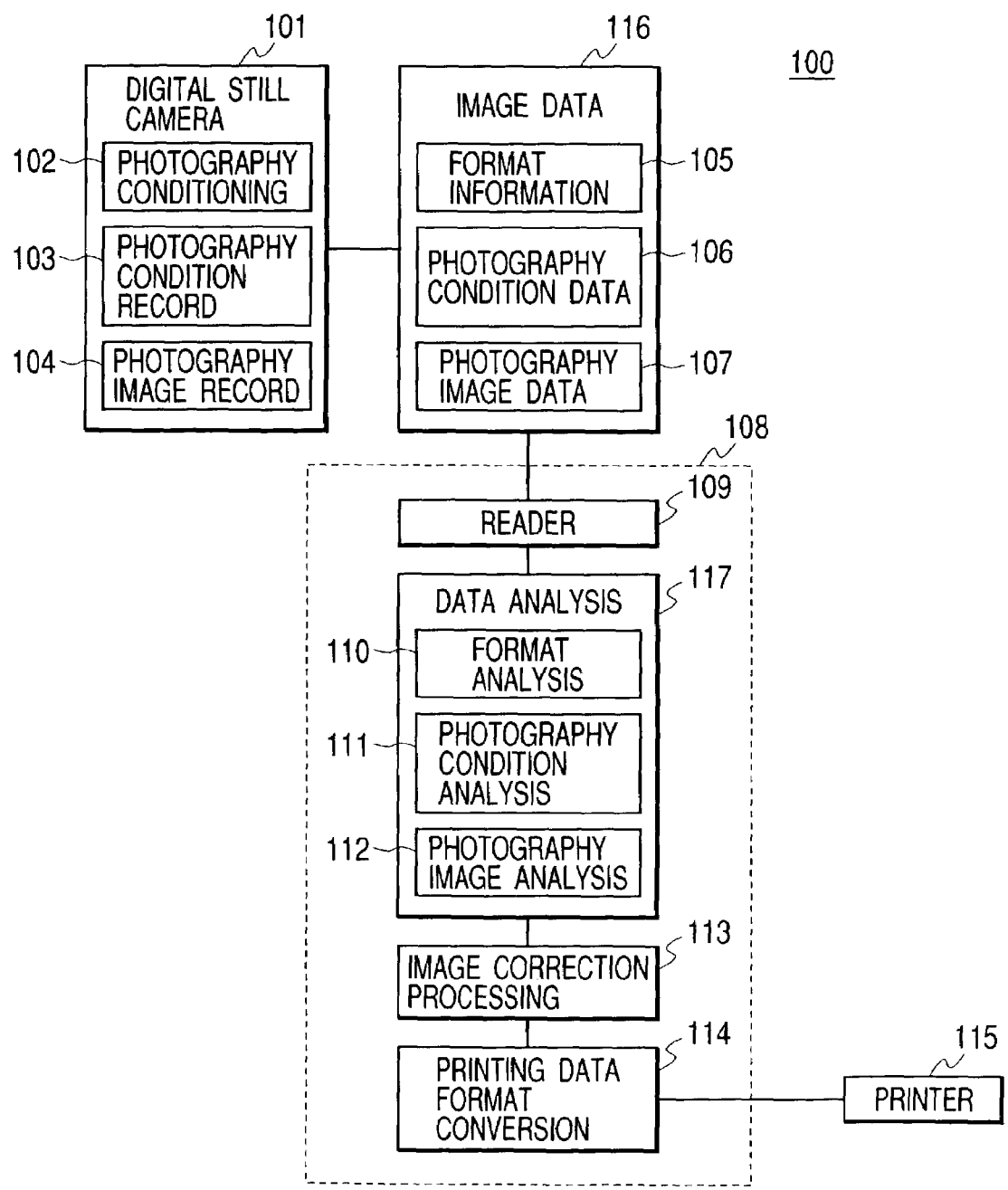
FIG. 1 is a block diagram showing the configuration of an image printing system to which the present invention is applied as a first embodiment thereof.

The present embodiment is applied to, for example, an image printing system 100 shown in FIG. 1.

The image printing system 100 of the present embodiment performs the image correction of image data to be processed, which has been obtained by photography with a digital still camera 101, on the basis of analysis results of the information which is added to the image data and indicates photography conditions (additional information) Thereby, the image printing apparatus 100 realizes a highly precise automatic image correction. Thus, the image printing system 100 is configured to be able to provide a high quality photographic image printing result which reflecting the intention of a user at the time of photography.

In the following, the configuration and the operation of the image printing system 100 of the present embodiment will concretely be described.

<Configuration of Image Printing System 100>

The image printing system 100 is composed of a digital still camera 101, an image processing apparatus 108 and a printer 115 as shown in FIG. 1.

The digital still camera 101 acquires photography image data 107 by a photography operation, and outputs image data 116 to the image processing apparatus 108. The image data 116 includes photography condition data 106 (additional information) at the photography operation, format information 105 indicating a format form for describing the photography condition data 106, and photography image data 107. The digital still camera 101 is provided with a photography condition setting unit 102, a photography condition record unit 103 and a photography image record unit 104.

The format information 105 is the information for discriminating forms. The format information 105 may be a name indicating a format form or may be version information. In the present embodiment, the case where the version number of the version information is used as the format information 105 will be described in the following.

The photography condition setting unit 102 sets various photography conditions necessary for photographing actions.

The photography condition record unit 103 records the photography condition data 106 set by the photography condition setting unit 102 into the image data 116 (data to be output to the image processing apparatus 108).

The photography image record unit 104 records the photography image data 107, which has been obtained at the photographing action under the photography conditions set by the photography condition setting unit 102, into the image data 116.

Incidentally, as a method for supplying the image data 116 to the image processing apparatus 108, for example, the following methods can be adopted. They are a data transfer method through a communication line, a method of recording the image data 116 into an arbitrary recording medium to be transferred, and the like.

The image processing apparatus 108 is composed of a personal computer, for example. When a predetermined piece of application software is activated, the image processing apparatus 108 performs the image correction processing of the photography image data 107 in the image data 116 from the digital still camera 101, and then the image processing apparatus 108 outputs the corrected photography image data 107 to the printer 115 to be printed out thereby.

For performing the operations described above, the image processing apparatus 108 is provided with a reader unit 109; a data analysis unit 117 including a format analysis unit 110, a photography condition analysis unit 111 and a photography image analysis unit 112; an image correction processing unit 113; and a printing data format conversion unit 114. Each function of the constituent units 109 to 114 and 117 is realized by the activation of the predetermined piece of application software.

The reader unit 109 reads the image data 116 from the digital still camera 101.

In the data analysis unit 117, the format analysis unit 110 analyzes the format information 105 included in the image data 116 obtained by the reader unit 109. The photography condition analysis unit 111 analyzes the photography condition data 106 included in the image data 116 obtained by the reader unit 109 on the basis of the analysis result of the format information (here, version information). Moreover, the photography image analysis unit 112 analyzes the photography image data 107 included in the image data 116 obtained by the reader unit 109. The data analysis unit 117 selects an image correction algorithm on the basis of these analysis results.

The image correction processing unit 113 performs the image correction processing of the photography image data 107 in accordance with the image correction algorithm selected by the data analysis unit 117.

The selection (determination) of the image correction algorithm will concretely be described. For example, if the photography image analysis unit 112 analyzes a luminance value, a luminance distribution and color information from the signal values of the photography image data 107, then the data analysis unit 117 recognizes the characteristics of the photography image data 107 on the basis of the results of the analysis of the photography image analysis unit 112, and the data analysis unit 117 determines the optimum correction condition applicable to the recognized characteristics. Furthermore, the data analysis unit 117 selects the image correction algorithm on the basis of the determined condition.

That is, an algorithm is determined on the basis of the analysis result of the format information (here, version information) by the format analysis unit 110, and on the basis of the analysis result of the photography condition data 106 by the photography condition analysis unit 111. And another algorithm is determined by the characteristic recognition of the photography image data 107 by the photography image analysis unit 112. Then, the selection of the final image correction algorithm is determined by both of the algorithms.

Moreover, the image correction processing includes brightness correction processing, contrast correction processing, color correction processing, color saturation correction processing, smoothing processing, edge enhancement processing, noise reduction processing and so forth.

The printing data format conversion unit 114 converts the photography image data 107 after the correction of the image correction processing unit 113 into pertinent format data capable of being printed by the printer 115 (e.g. cyan-magenta-yellow-black (CMYK) data), and then the printing data format conversion unit 114 transfers the converted data to the printer 115 through a predetermined interface.

Consequently, the printer 115 prints out the data transferred from the printing data format conversion unit 114 of the image processing apparatus 108.

As the printer 115, for example, a serial scan type ink jet printer or the like can be adopted.

Incidentally, in the present embodiment, the constituent units 109 to 114 and 117 included in the image processing apparatus 108 are realized by the actuation of the application software operating on the personal computer. However, the present invention is not limited to such a configuration. The constituent units 109 to 114 and 117 may be realized with, for example, hardware. To put it more concretely, they may be realized in the form of a driver of the printer 115.

Moreover, if a personal computer, for example, is used as the image processing apparatus 108, then the image data 116 may be stored in a storage medium such as a hard disk in the image processing apparatus 108. In another case, the image data 116 may be stored in a storage medium of another personal computer (including a server or the like) connected to the image processing apparatus 108. Then, the image processing apparatus 108 may read the image data 116 stored in those storage media to process the image data 116 in the image processing apparatus 108.

Moreover, as described above, an arbitrary communication line or a recording medium can be used for the transfer of the image data 116 from the digital still camera 101 to the image processing apparatus 108 (storage medium or the like in a personal computer in the case where the personal computer is used as the image processing apparatus 108) as the transferring method of the image data 116. To put it more concretely, for example, a card reader can be adopted as the recording medium as well as cable connection, infrared-ray communication or radio communication as the communication line. In this case, for example, the digital still camera 101 may be connected with the image processing apparatus 108 with a cable, an infrared ray or radio waves in order that the image processing apparatus 108 may directly read the image data 116 from a memory card, an integrated memory or the like which is included in the digital still camera 101.

Moreover, the configuration in which the functions of the image processing apparatus 108 are installed into, for example, the printer 115 may be adopted as one of the system forms of the image printing system 100. In this case, it is unnecessary to use a personal computer as the image processing apparatus 108. Moreover, in this case, the image data 116 may be read by, for example, a data reading unit such as a card reader (corresponding to the functions of the reader unit 109) of the printer 115 from a recording medium such as a memory card. In another case, the digital still camera 101 may be connected to the printer 115 with a hardwiring cable, infrared-ray communication or radio communication in order that the printer 115 may read the image data 116 from the memory card, the integrated memory or the like held in the digital still camera 101.

<Format of Image Data 116>

The format of the image data 116 here means a recording format at the time when the digital still camera 101 records the image data 116 into an arbitrary recording medium or a format at the time when the image data 116 is transferred to the image processing apparatus 108.

Figure 2:
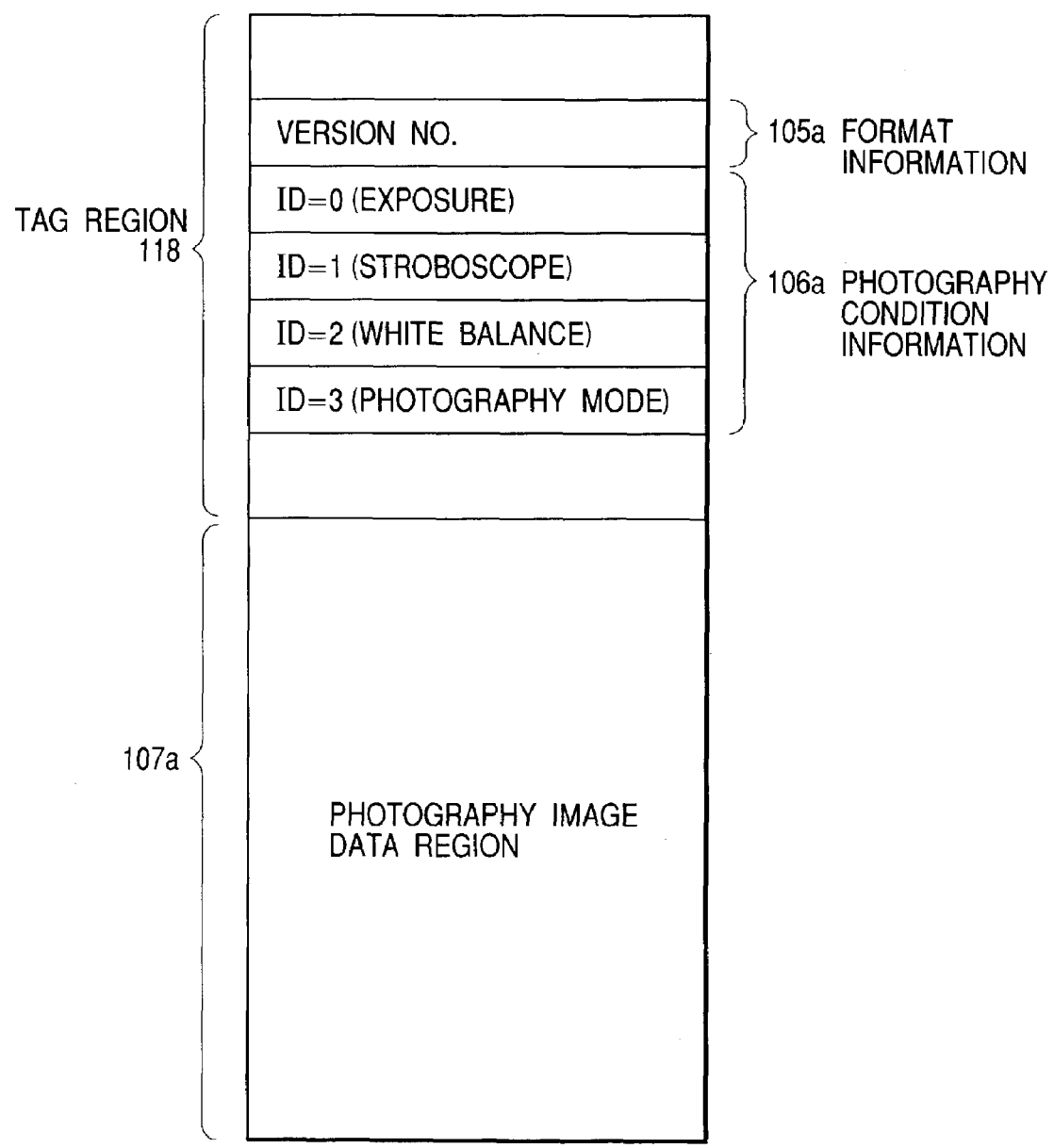
FIG. 2 is a view for illustrating image data to be processed in the image printing system.

The image data 116, for example, as shown in FIG. 2, is composed of a tag region 118 and a photography image data region 107a. The tag region 118 includes a format information (version information) region 105a and a photography condition data region 106a. The format information region 105a is a recording region for the format information (version information) 105. The photography condition data region 106a is a recording region for the photography condition data 106. The photography image data region 107a is a recording region of the photography image data 107.

The image data 116 may be compressed data or non-compressed data. Moreover, the image data 116 may be partially compressed. For example, the format information (version information) 105 and the photography condition data 106 of the image data 116 may be uncompressed, and the photography image data 107 may be compressed.

Moreover, red-green-blue (RGB) data or YCC (brightness and color difference) data may be used as the photography image data 107. For example, if the YCC data is used as the photography image data 107, then the reader unit 109 of the image processing apparatus 108 converts the YCC data to RGB data.

The format information (version information) 105 and the photography condition data 106 are recorded at positions distant by predetermined data offsets from the front position of the tag region 118 of the image data 116. Moreover, the photography condition data 106 (photography condition information of the digital still camera 101) is data related to, for example, exposure, a stroboscope, a white balance, a photography mode and the like. The photography condition data 106 has a data format capable of being commonly owned by both of the digital still camera 101 on the data input side and the printer 115 on the data output side.

The format information (version information) 105 includes a concrete version number or a mark indicating the version information.

Figure 3:
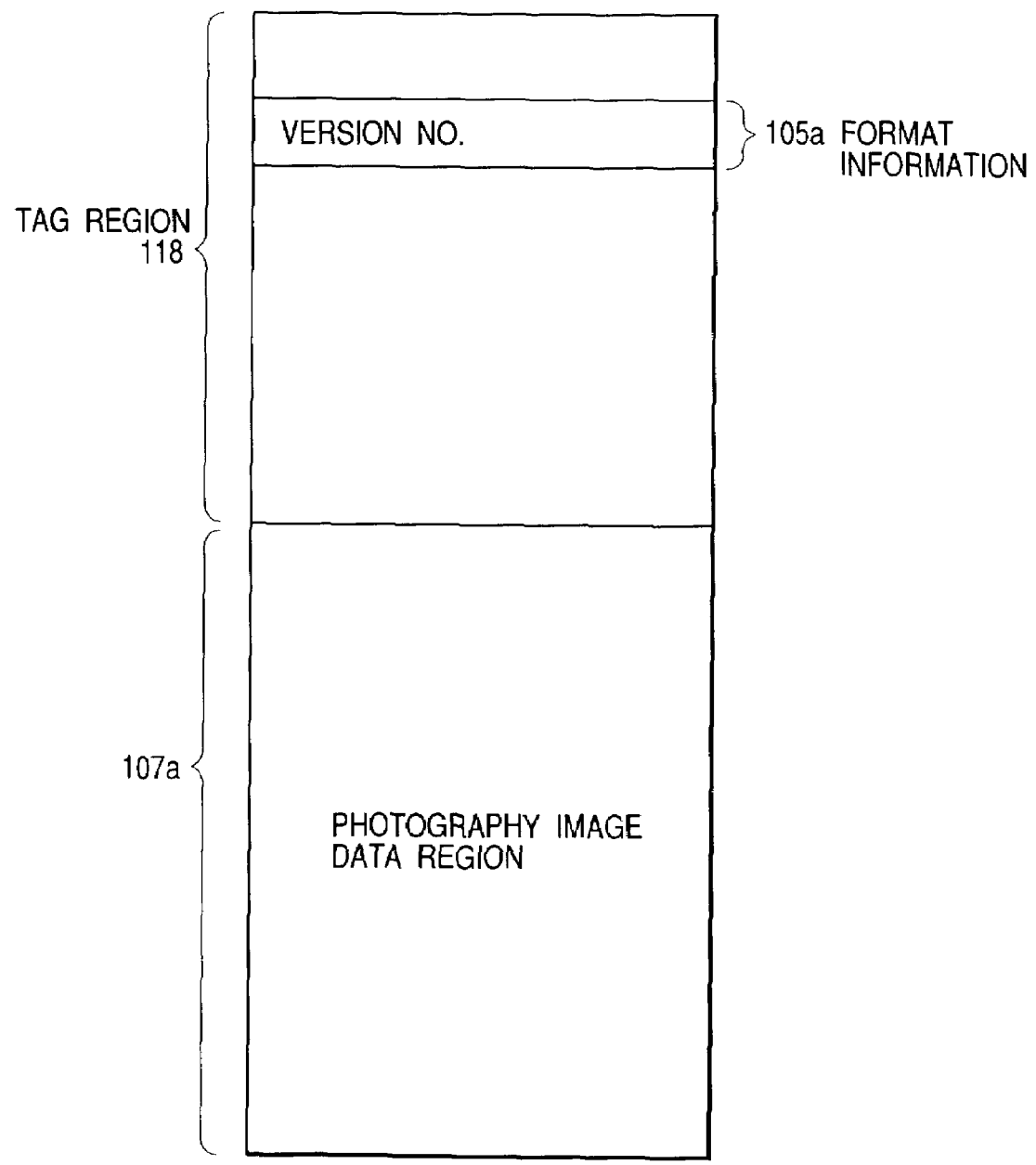
FIG. 3 is a view for illustrating another piece of image data to be processed in the image printing system.

For example, in the present embodiment, if the version number is 2 as shown in FIG. 2, then the photography condition data 106 includes pieces of information having ID's 0 to 3. If the version number is 1 as shown in FIG. 3, then the photography condition data 106 is not included in the image information 116.

Descriptions will be given about the pieces of information ID's 0 to 3 in the case where the photography condition data 106 is included in the image data 116.

ID=0 (offset=n) is the information concerning exposure.

For example, if the photography image data 107 was obtained by the photography in the automatic exposure mode of the digital still camera 101, i.e. if the photography image data 107 was obtained by the photography at the time of the "automatic exposure" mode, then a parameter "0" is set as the information ID=0 in the photography condition data 106. On the other hand, if the photography image data 107 was obtained by the photography in the manual mode, i.e. if the photography image data 107 was obtained by the photography at the time of the "manual exposure" mode, then a parameter "1" is set as the information ID=0 in the photography condition data 106.

ID=1 (offset=n+1) is the information concerning a stroboscope.

For example, if the photography image data 107 was obtained in the state in which the stroboscope of the digital still camera 101 did not emit light, i.e. if the photography image data 107 was obtained by the photography at the time of the "stroboscope un-emission" mode, then a parameter "0" is set as the information ID=1 in the photography condition data 106. On the other hand, if the photography image data 107 was obtained in the state in which the stroboscope emitted light, i.e. if the photography image data 107 was obtained by the photography at the time of the "stroboscope emission" mode, then a parameter "1" is set as the information ID=1 in the photography condition data 106.

ID=2 (offset=n+2) is the information concerning white balance.

For example, if the photography image data 107 was obtained in the automatic white balance mode of the digital still camera 101, i.e. if the photography image data 107 was obtained by the photography at the time of the "automatic white balance" mode, then a parameter "0" is set as the information ID=2 in the photography condition data 106. On the other hand, if the photography image data 107 was obtained in the manual white balance mode, i.e. if the photography image data 107 was obtained at the time of the photography in the "manual white balance" mode, then a parameter "1" is set as the information ID=2 in the photography condition mode 106.

ID=3 (offset=n+3) is the information concerning the photography mode.

For example, if the image correction processing at the time when the image processing apparatus 108 prints out the photography image data 107 is disabled, then a parameter "0" indicating the "effect disable" mode is set as the information ID=3. On the other hand, if the image correction processing at the time when the image processing apparatus 108 prints out the photography image data 107 is enabled, then a parameter "1" indicating the "standard" mode is set as the information ID=3. Moreover, if the photography image data 107 was obtained in the "scenery" mode of the digital still camera 101, then a parameter "2" is set as the information ID=3. Moreover, if the photography image data 107 was obtained in the "person" mode of the digital still camera 101, then a parameter "3" is set as the information ID=3.

<Operation of Image Processing Apparatus 108>

Figure 4:
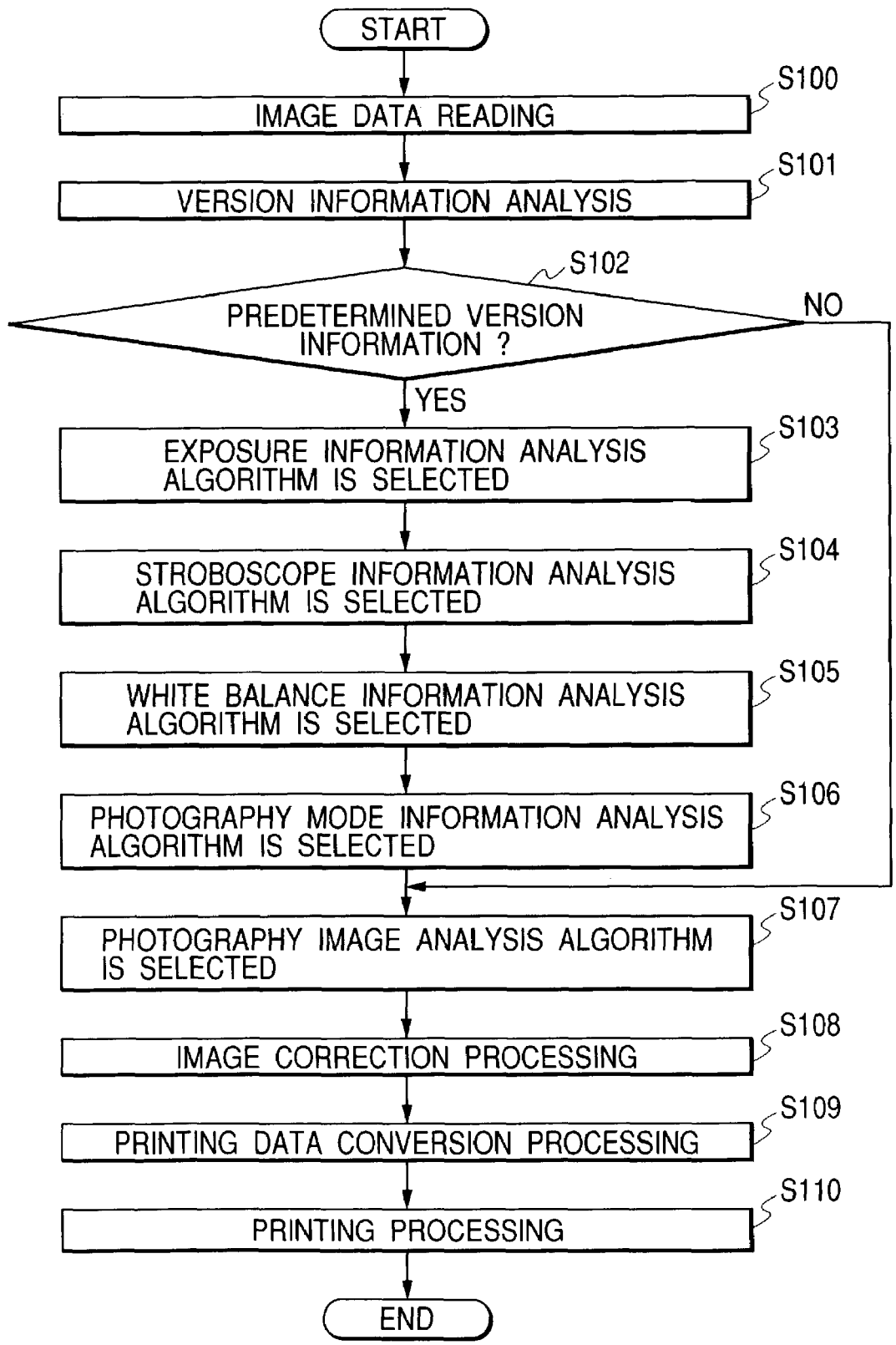
FIG. 4 is a flow chart for illustrating the operation of an image processing apparatus of the image printing system.

FIG. 4 shows the operation of the image processing apparatus 108 as a flow chart.

Step S100:

The reader unit 109 reads image data 116 therein.

Step S101:

The data analysis unit 117 analyzes the format information (version information: here, "2") in the format information 105 of the image data 116 obtained by the reader unit 109 with the format analysis unit 110.

Step S102:

If the format analysis unit 110 judges that the format information is equal to the predetermined format information (version information: here, "2"), then the operation of the image processing apparatus 108 proceeds to Step S103. If the format analysis unit 110 judges that the format information is not equal to the predetermined format information (version information: here "2"), then the operation of the image processing apparatus 108 skips the steps after the Step S103 to proceed to Step S107.

Step S103:

The data analysis unit 117 analyzes the information ID=0 (exposure information) in the photography condition data 106 of the image data 116 obtained by the reader unit 109 with the photography condition analysis unit 111, and selects an image correction algorithm for performing the image correction of the photography image data 107 on the basis of the analysis result.

To put it concretely, if the parameter of the information ID=0 indicates the "automatic exposure" mode, then the data analysis unit 117 selects an image correction algorithm to execute the image correction processing of brightness for correcting underexposure or overexposure. On the other hand, if the parameter of the information ID=0 indicates the "manual exposure" mode, then the data analysis unit 117 selects an image correction algorithm not to execute the image correction processing of brightness. Thereby, it can be prevented that the brightness of a photography image is corrected differently from the user's intention at the time of photography.

Step S104:

The data analysis unit 117 analyzes the information ID=1 (stroboscope information) in the photography condition data 106 of the image data 116 obtained by the reader unit 109 with the photography condition analysis unit 111, and selects an image correction algorithm for executing the image correction of the photography image data 107.

To put it concretely, for example, if the parameter of the information ID=1 indicates the "stroboscope emission" mode, then the data analysis unit 117 selects an image correction algorithm to execute the processing of correction of contrast. On the other hand, if the parameter of the information ID=1 indicates the "stroboscope un-emission" mode, then the data analysis unit 117 selects an image correction algorithm not to execute the image correction processing relative to the contrast of the image data 116. Thereby, it is possible to perform the optimum image correction of a photography image obtained by the photography with the emission of a stroboscope or with the un-emission of the stroboscope.

Step S105:

The data analysis unit 117 analyzes the information ID=2 (white balance information) in the photography condition data 106 of the image data 116 obtained by the reader unit 109 with the photography condition analysis unit 111, and selects an image correction algorithm to execute the image correction of the photography image data 107 on the basis of the analysis result.

To put it concretely, for example, if the parameter of the information ID=2 indicates the "automatic white balance" mode, then the data analysis unit 117 selects an image correction algorithm to execute a color balance correction for adjusting the white balance of the image data 116 to be pertinent. On the other hand, if the parameter of the information ID=2 indicates the "manual white balance" mode, then the data analysis unit 117 selects an image correction algorithm not to execute any image correction processing with regard to the color balance of the image data 116. Thereby, it is possible to prevent that the color balance of the image data 116 is corrected differently from the user's intention at the time of photography.

Step S106:

The data analysis unit 117 analyzes the information ID=3 (photography mode information) in the photography condition data 106 of the image data 116 obtained by the reader unit 109 with the photography condition analysis unit 111, and selects an image correction algorithm to execute the image correction of the photography image data 107 on the basis of the analysis result.

To put it concretely, for example, if the parameter of the information ID=3 indicates the "standard" mode, then the data analysis unit 117 selects an image correction algorithm to execute the automatic image correction which is set as the standard mode. On the other hand, if the parameter of the information ID=3 indicates the "effect disable" mode, then the data analysis unit 117 selects an image correction algorithm not to execute any specific image correction processing of the image data 116. Moreover, if the information ID=3 indicates the "scenery" mode, then the data analysis unit 117 selects an image correction algorithm to correct the image data to be an image having color saturation higher than that of the "standard" mode. Furthermore, if the information ID=3 indicates the "person" mode, then the data analysis unit 117 selects an image correction algorithm to execute the image correction processing by which the skin of a person in an image is preferably printed. Thereby, it becomes possible to perform the optimum image correction according to the scene being the object of photography. Moreover, it can be previously prevented to deteriorate the image quality instead of improving it owing to double processing when any image correction was performed at the time of printing the image data 116 which has already had a specific effect added by the digital still camera 101.

Step S107:

The data analysis unit 117 analyzes the photography image data 107 itself of the image data 116 obtained by the reader unit 109 with the photography image analysis unit 112, and selects an image correction algorithm to make the photography image data 107 be in the optimum condition at the time of printing out the photography image data 107.

The selection of the image correction algorithm here is executed in consideration of the image correction algorithms selected at each of the Steps S103 to S106.

If the operation of the image processing apparatus 108 has proceeded to the Step S107 by skipping the steps from the Step S103 downward on the basis of the analysis of the format information (version information) at each of the Steps S101 and S102, then the data analysis unit 117 judged that there was no photography condition data 106 necessary for each of the Steps from the Step S103 downward in the image data 116 on the basis of the analysis result of the format information (version information). In this case, the image correction processing unit 113 executes the image correction of the photography image data 107 in accordance with the image correction algorithms to be selected in each mode of the "automatic exposure" mode at Step S103, the "stroboscope un-emission" mode at Step S104, the "automatic white balance" mode at Step S105 and the "standard" mode at Step S106.

Step S108:

The image correction processing unit 113 executes the image correction processing of the photography image data 107 in conformity with the image correction algorithms selected by the data analysis unit 117 at the Steps S101 to S107.

Step S109:

The printing data format conversion unit 114 converts the photography image data 107 after being processed by the image correction processing unit 113 into the data in the format capable of being printed by the printer 115.

Step S110:

The printer 115 prints out the photography image data 107 (data received the conversion processing of the printing data format conversion unit 114) processed by the image processing apparatus 108 in the way described above.

According to the present embodiment described above, it is possible to realize the highly precise automatic image correction processing using the photography image data 107 and the photography condition data 106 being the additional information indicating the photography conditions of the photography image data 107 at the time of printing out the photography image data 107. Thereby, it is possible to provide a high quality printout result (photographic image printing result) highly reflecting the user's intention at the time of photography.

Moreover, even if the format information (version information) differs from the predetermined version information, namely even if the image data 116 has no photography condition data 106, then it is possible to perform the pertinent automatic correction processing of the photography image data 107.

In the present embodiment, if the format information (version information), which is the additional information indicating the photography conditions, differs from the predetermined version information, namely if the image data 116 has no photography condition data 106, then the embodiment performs the image correction processing of the object image in accordance with the predetermined photography conditions, which were determined in advance. However, the present invention is not limited to the embodiment. That is, different image correction conditions may be set according to the format information (version information).

For example, a plurality of patterns of pieces of information indicating conditions and the contents of corrections under the conditions may be prepared to every version information (e.g. version number) in a memory (not shown) in advance. Then, it is possible to perform different pieces of processing according to the versions. And it is preferable to constitute the system to be able to add correction methods at every version into the memory for the case where a new version will appear in future.

Moreover, the method for reading the photography condition data, the number of the items of the photography condition data to be read in, and the meanings of the read out values may be changed according to the format information (version information).

Incidentally, the photography condition data 106 is not limited to the various pieces of information as shown in the example of FIG. 2. Any information may be adopted as the photography condition data 106 as long as the information can specify the user's intention at the time of photography or the photography scene. Moreover, for example, the information or the like indicating the characteristics at the time of obtaining a photography image may be adopted as the photography condition data 106.

Furthermore, the contents of the image correction processing executed on the basis of the analysis results of the photography condition data 106 may be sufficient if only the contents are the optimum image correction processing according to the characteristics and the like of the printer 115 to be used for printing out. Thus, the contents of the image correction processing are not limited to those described above.

Moreover, the present invention is not limited to the present embodiment, and can be embodied by being variously changed within the subject matter of the present invention.

Second Embodiment

In the present embodiment, descriptions will be given to the processing in case of considering, for example, the format data shown in FIG. 5 as the image data 116 in place of the format data shown in FIG. 2 in the image printing system 100 shown in FIG. 1.

Figure 5:
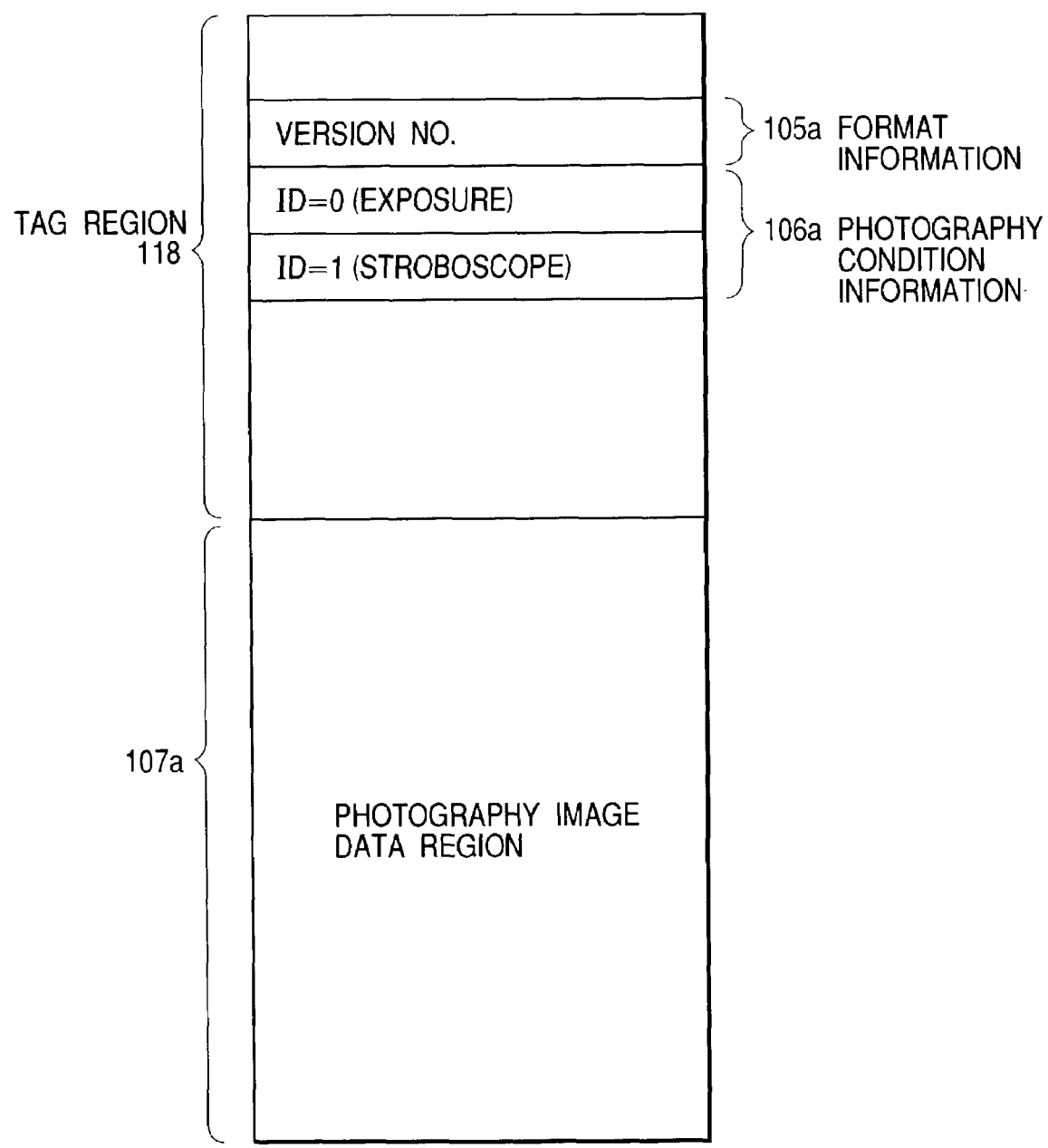
FIG. 5 is a view for illustrating a recording state of image data in an image processing apparatus in a second embodiment.

The image data 116 shown in FIG. 5 is similar to the ones shown in FIGS. 2 and 3. However, although the format information (version information) 105 describes the version information ("2" in the description of the preceding embodiment) including the information of the photography condition data, the format information 105 does not include all pieces of the information ID's=0 to 3 as shown in FIG. 2, but includes only a part of the pieces of the information.

The things different from those of the first embodiment exist in the processing method in the case where the photography condition data 106 describes only a part of the pieces of information as the image data shown in FIG. 5.

The descriptions of the processing in the present embodiment will concretely be performed only about the configurations and operations different from those of the first embodiment.

Figure 6:
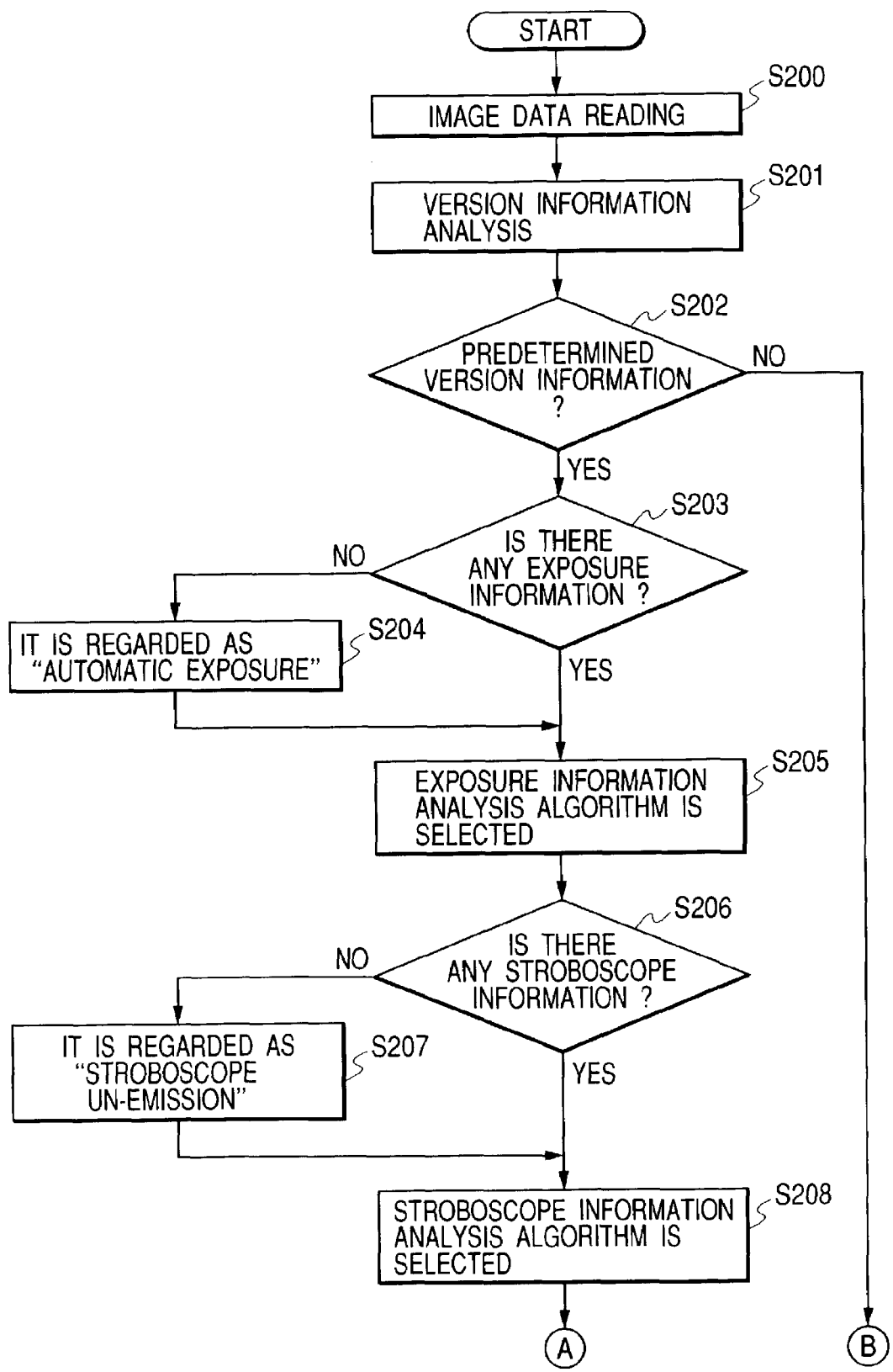
FIG. 6 is a flow chart for illustrating a part of the operation of the image processing apparatus in the second embodiment.
Figure 7:
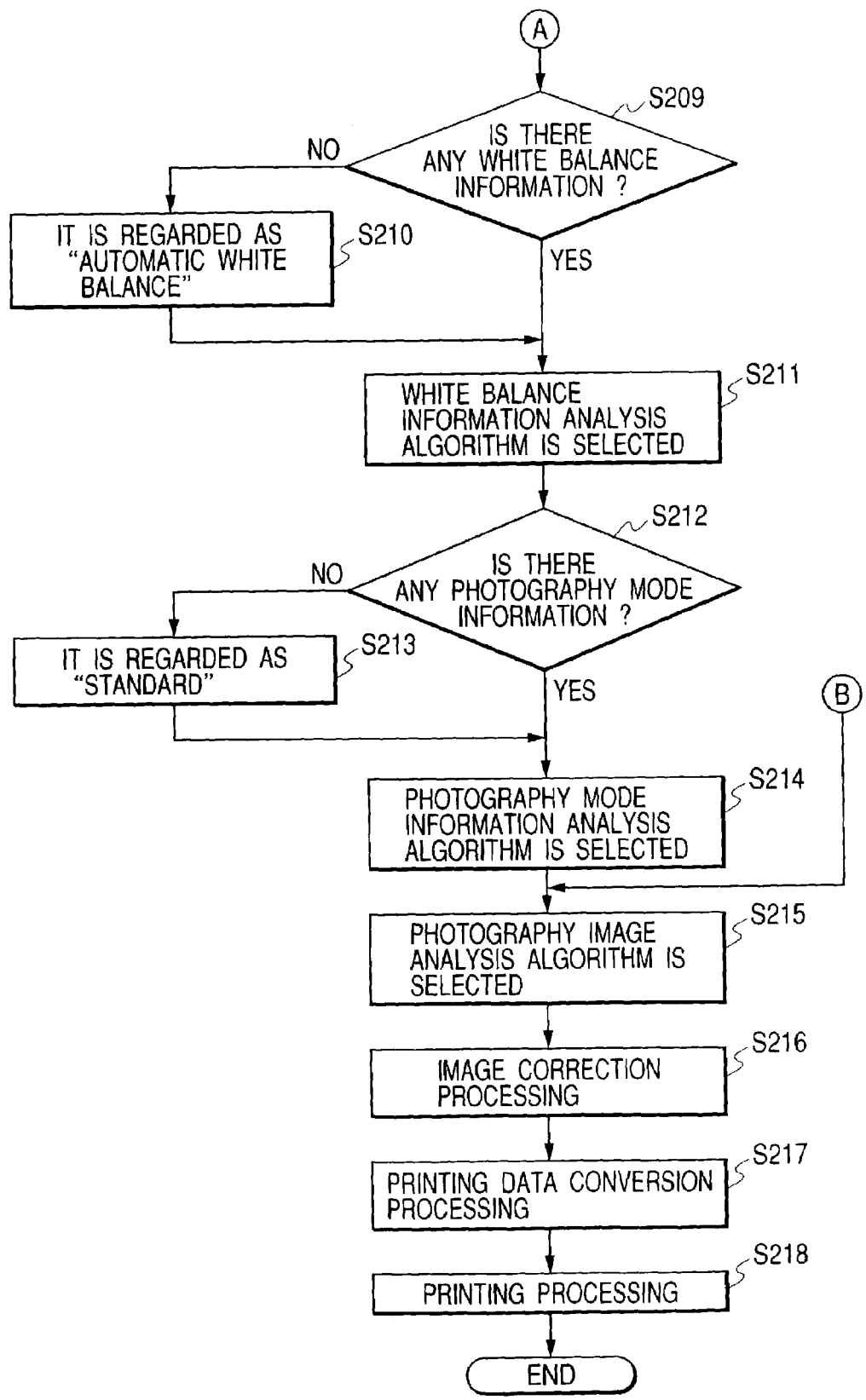
FIG. 7 is a flow chart for illustrating the other part of the operation of the image processing apparatus in the second embodiment.

FIGS. 6 and 7 show the operations of the image processing apparatus 108 in the present embodiment by means of flow charts.

Step S200:

The reader unit 109 reads image data 116 therein.

Step S201:

The data analysis unit 117 analyzes the format information (version information: here, "2") in the format information 105 of the image data 116 obtained by the reader unit 109 with the format analysis unit 110.

Step S202:

If the format analysis unit 110 judges that the format information is equal to the predetermined format information (version information: here, "2"), then the operation of the image processing apparatus 108 proceeds to Step S203.

If the format analysis unit 110 judges that the format information is not equal to the predetermined format information (version information: here "2"), then the operation of the image processing apparatus 108 skips the steps from the Step S203 downward, and proceeds to Step S215.

Step S203:

The data analysis unit 117 analyzes the existence of the information ID=0 (exposure information) in the photography condition data 106 of the image data 116 obtained by the reader unit 109 with the photography condition analysis unit 111. If the information ID=0 (exposure information) exists in the photography condition data 106, then the operation of the image processing apparatus 108 proceeds to Step S205. If the information ID=0 does not exist in the photography condition data 106, then the operation of the image processing apparatus 108 proceeds to Step S204.

Step S204:

Since it is impossible to perform an actual analysis owing to the non-existence of the information ID=0 (exposure information), the data analysis unit 117 regards the analysis result of the photography condition analysis unit 111 as the image in the "automatic exposure" mode. Then, the data analysis unit 117 selects an image correction algorithm on the assumption at Step S205.

Step S205:

The data analysis unit 117 analyzes the information ID=0 (exposure information) in the photography condition data 106 of the image data 116 obtained by the reader unit 109 with the photography condition analysis unit 111, and selects an image correction algorithm to execute the image correction of the photography image data 107 on the basis of the analysis result.

To put it concretely, for example, if the parameter of the information ID=0 indicates the "automatic exposure" mode, then the data analysis unit 117 selects an image correction algorithm to execute the image correction processing of brightness for correcting underexposure or overexposure. On the other hand, if the parameter of the information ID=0 indicates the "manual exposure" mode, then the data analysis unit 117 selects an image correction algorithm not to execute the image correction processing related to brightness. Thereby, it can be prevented that the brightness of a photography image is corrected differently from the user's intention at the time of photography. It is needless to say that it is preferable to change the degree of the correction at every version information.

Step S206:

The data analysis unit 117 analyzes the existence of the information ID=1 (stroboscope information) in the photography condition data 106 of the image data 116 obtained by the reader unit 109 with the photography condition analysis unit 111. If the information ID=1 (stroboscope information) exists, then the operation of the image processing apparatus 108 proceeds to Step S208. If the information ID=1 does not exist, then the operation of the image processing apparatus 108 proceeds to Step S207.

Step S207:

Since the information ID=1 (stroboscope information) does not exist, the data analysis unit 117 cannot perform any actual analysis at the next Step S208. Accordingly, the data analysis unit 117 regards the analysis result of the photography condition analysis unit 111 as the image in the "stroboscope un-emission" mode, and selects an image correction algorithm at Step S208.

Step S208:

The data analysis unit 117 analyzes the information ID=1 (stroboscope information) in the photography condition data 106 of the image data 116 obtained by the reader unit 109 with the photography condition analysis unit 111, and selects an image correction algorithm for executing the image correction of the photography image data 107.

To put it concretely, for example, if the parameter of the information ID=1 indicates the "stroboscope emission" mode, then the data analysis unit 117 selects an image correction algorithm to execute the processing of correction of contrast. On the other hand, if the parameter of the information ID=1 indicates the "stroboscope un-emission" mode, then the data analysis unit 117 selects an image correction algorithm not to execute the image correction processing relative to the contrast of the image data 116. Thereby, it is possible to perform the optimum image correction of a photography image obtained by the photography with the emission of a stroboscope or with the un-emission of the stroboscope. It is needless to say that it is preferable to change the degree of the correction at every version information.

Step S209:

The data analysis unit 117 analyzes the existence of the information ID=2 (white balance information) in the photography condition data 106 of the image data 116 obtained by the reader unit 109 with the photography condition analysis unit 111. If the information ID=2 (white balance information) exists, then the operation of the image processing apparatus 108 proceeds to Step S211. If the information ID=2 does not exist, then the operation of the image processing apparatus 108 proceeds to Step S210.

Step S210:

Since the information ID=2 (white balance information) does not exist, the data analysis unit 117 cannot perform any actual analysis at the next Step S211. Accordingly, the data analysis unit 117 regards the analysis result of the photography condition analysis unit 111 as the image in the "automatic white balance" mode, and selects an image correction algorithm at Step S211.

Step S211:

The data analysis unit 117 analyzes the information ID=2 (white balance information) in the photography condition data 106 of the image data 116 obtained by the reader unit 109 with the photography condition analysis unit 111, and selects an image correction algorithm to execute the image correction of the photography image data 107 on the basis of the analysis result.

To put it concretely, for example, if the parameter of the information ID=2 indicates the "automatic white balance" mode, then the data analysis unit 117 selects an image correction algorithm to execute a color balance correction for adjusting the white balance of the image data 116 to be pertinent. On the other hand, if the parameter of the information ID=2 indicates the "manual white balance" mode, then the data analysis unit 117 selects an image correction algorithm not to execute any image correction processing with regard to the color balance of the image data 116. Thereby, it is possible to prevent that the color balance of the image data 116 is corrected differently from the user's intention at the time of photography. It is needless to say that it is preferable to change the degree of the correction at every version information.

Step S212:

The data analysis unit 117 analyzes the existence of the information ID=3 (photography mode information) in the photography condition data 106 of the image data 116 obtained by the reader unit 109 with the photography condition analysis unit 111. If the information ID=3 (photography mode information) exists, then the operation of the image processing apparatus 108 proceeds to Step S214. If the information ID=3 does not exist, then the operation of the image processing apparatus 108 proceeds to Step S213.

Step S213:

Since the information ID=3 (photography mode information) does not exist, the data analysis unit 117 cannot perform any actual analysis at the next Step S214. Accordingly, the data analysis unit 117 regards the analysis result of the photography condition analysis unit 111 as the image in the "standard" mode, and selects an image correction algorithm at Step S214.

Step S214:

The data analysis unit 117 analyzes the information ID=3 (photography mode information) in the photography condition data 106 of the image data 116 obtained by the reader unit 109 with the photography condition analysis unit 111, and selects an image correction algorithm to execute the image correction of the photography image data 107 on the basis of the analysis result.

To put it concretely, for example, if the parameter of the information ID=3 indicates the "standard" mode, then the data analysis unit 117 selects an image correction algorithm to execute the automatic image correction which is set as the standard mode. On the other hand, if the parameter of the information ID=3 indicates the "effect disable" mode, then the data analysis unit 117 selects an image correction algorithm not to execute any specific image correction processing of the image data 116. Moreover, if the information ID=3 indicates the "scenery" mode, then the data analysis unit 117 selects an image correction algorithm to correct the image data to be an image having color saturation higher than that of the "standard" mode. Furthermore, if the information ID=3 indicates the "person" mode, then the data analysis unit 117 selects an image correction algorithm to execute the image correction processing by which the skin of a person in an image is preferably printed. Thereby, it becomes possible to perform the optimum image correction according to the scene being the object of photography. Moreover, it can be previously prevented to deteriorate the image quality instead of improving it owing to double processing when some image correction is performed at the time of printing the image data 116 which has already had a specific effect added by the digital still camera 101. It is needless to say that it is preferable to change the degree of the correction at every version information.

Step S215:

The data analysis unit 117 analyzes the photography image data 107 itself of the image data 116 obtained by the reader unit 109 with the photography image analysis unit 112, and selects an image correction algorithm to make the photography image data 107 be in the optimum condition at the time of printing out the photography image data 107.

The selection of the algorithm here is executed in consideration of the image correction algorithms selected at each of the Steps S203 to S214.

If the operation of the image processing apparatus 108 has proceeded to the Step S215 by skipping the steps from the Step S203 downward on the basis of the analysis of the format information (version information) at each of the Steps S201 and S202, then the data analysis unit 117 judged that there was no photography condition data 106 necessary for each of the Steps from the Step S103 downward in the image data 116 on the basis of the analysis result of the format information (version information). In this case, the image correction processing unit 113 executes the image correction of the photography image data 107 in accordance with the image correction algorithms to be selected in each mode of the "automatic exposure" mode at Step S205, the "stroboscope un-emission" mode at Step S208, the "automatic white balance" mode at Step S211 and the "standard" mode at Step S214.

Step S216:

The image correction processing unit 113 executes the image correction processing of the photography image data 107 in conformity with the image correction algorithms selected by the data analysis unit 117 at the Steps S201 to S215.

Step S217:

The printing data format conversion unit 114 converts the photography image data 107 after being processed by the image correction processing unit 113 into the data in the format capable of being printed by the printer 115.

Step S218:

The printer 115 prints out the photography image data 107 (data received the conversion processing of the printing data format conversion unit 114) processed by the image processing unit 108 in the way described above.

According to the present embodiment described above, it is possible to realize the highly precise automatic image correction processing using the photography image data 107 and the photography condition data 106 being the additional information indicating the photography conditions of the photography image data 107 at the time of printing out the photography image data 107. Thereby, it is possible to provide a high quality printout result (photographic image printing result) highly reflecting the user's intention at the time of photography.

Moreover, even if the format information (version information) 105, which is the additional information indicating the photography conditions, differs from the predetermined version information, namely if the image data 116 has no photography condition data 106, or even if the image data 116 has only a part of the described photography conditions, it is possible to perform the pertinent automatic correction processing of the photography image data 107.

Moreover, in the present embodiment, if the format information (version information) 105 differs from the predetermined version information, namely if the image data 116 has no photography condition data 106, or even if the image data 116 has only a part of the described photography conditions, then the embodiment performs the image correction processing of the object image in accordance with the predetermined photography conditions, which were determined in advance. However, the present invention is not limited to the embodiment. That is, different image correction conditions may be set according to the format information (version information). In another case, different image correction conditions may be set according to the existence of the photography condition data 106.

Moreover, the method for reading the photography condition data, the number of the items of the photography condition data to be read in, and the meaning of the read out values may be changed according to the format information (version information).

Incidentally, the photography condition data 106 is not limited to the various pieces of information as shown in the example of FIG. 2. Any information may be adopted as the photography condition data 106 as long as the information can specify the user's intention at the time of photography or the photography scene. Moreover, for example, the information or the like indicating the characteristics at the time of obtaining a photography image may be adopted as the photography condition data 106.

Furthermore, the contents of the image correction processing executed on the basis of the analysis result of the photography condition data 106 may be sufficient if only the contents are the optimum image correction processing according to the characteristics and the like of the printer 115 to be used for printing out. Thus, the image correction processing is not limited to the processing described above.

Moreover, the present invention is not limited to the present embodiment, and can be embodied by being variously changed within the subject matter of the present invention.

Third Embodiment

Figure 8:
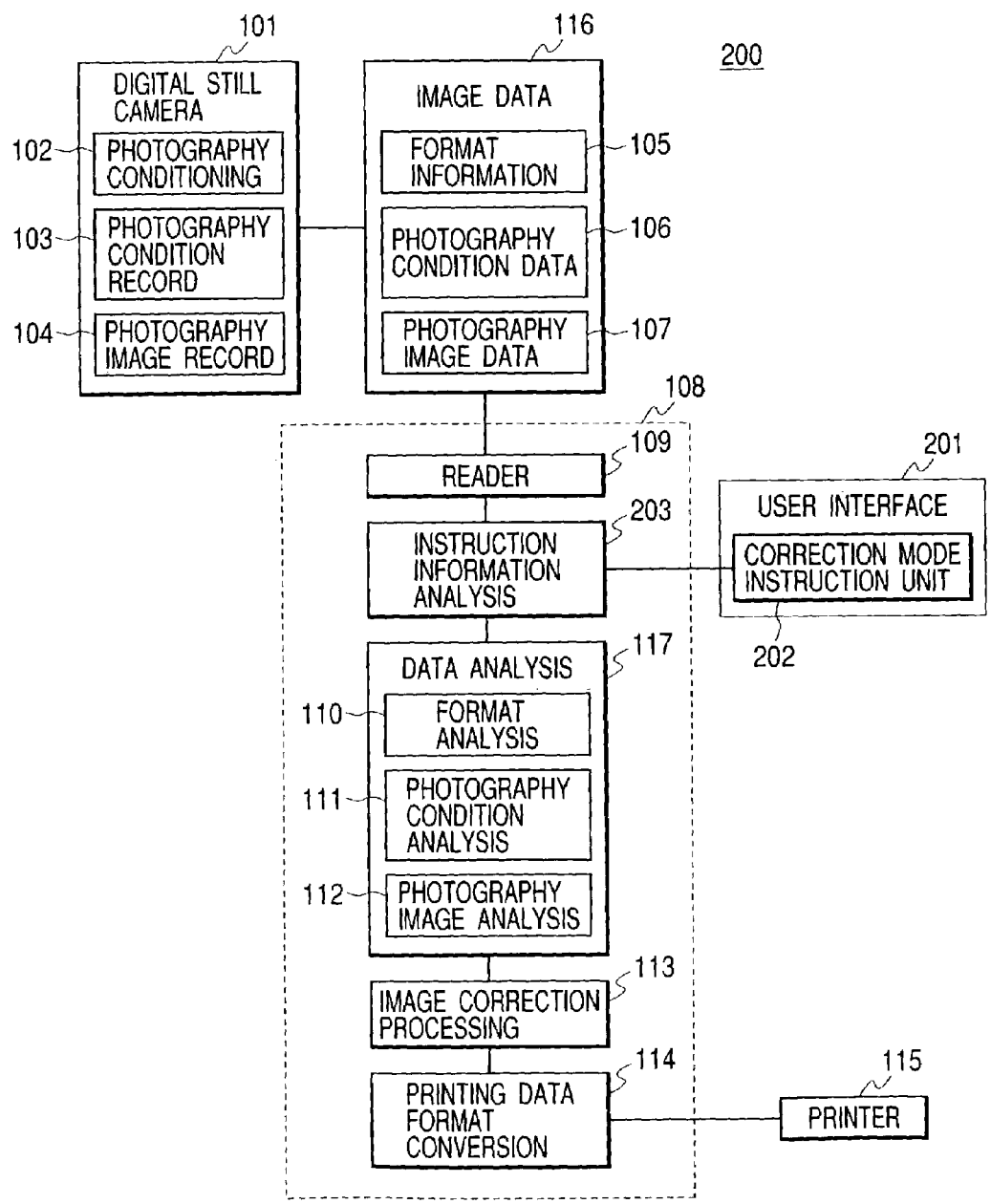
FIG. 8 is a block diagram showing the configuration of an image printing system to which the present invention is applied as a third embodiment thereof.

In the present embodiment, the present invention is applied to, for example, an image printing system 200 shown in FIG. 8.

The parts of the image printing system 200 of the present embodiment which execute similar processing to those of the image printing system 100 shown in FIG. 1 are designated by the same reference numerals as those in FIG. 1, and their detailed descriptions are omitted.

The image printing system 200 of the present embodiment further includes the additional components of a user interface 201 and an instruction information analysis unit 203 to the image printing system 100 in the first and the second embodiments. The user interface 201 includes a correction mode instruction unit 202 for instructing a correction mode. The instruction information analysis unit 203 analyzes instruction information from the correction mode instruction unit 203.

The correction mode instruction unit 202 of the user interface 201 makes a monitor connected to the personal computer or the printer 115 show an image correction setting display shown in FIG. 9 on the screen of the monitor or the panel of the printer 115.

In the image correction setting display of FIG. 9, it is possible to set whether to perform automatic image correction or not. In addition, it is also possible to set to select only a specific version for executing the automatic image correction in case of performing the automatic image correction. When check boxes of each displayed item are checked using a keyboard or a switch on the printer 115, it becomes possible to make the image processing apparatus 108 execute the correction operation thereof in the instructed mode.

The example of FIG. 9 shows a case in which the image correction is set to execute the automatic image correction only of the file of version 2.

The setting instruction state is analyzed by the instruction information analysis unit 203 in the image printing system 200 of FIG. 8, and is reflected in the control of the following correction operations.

Figure 10:
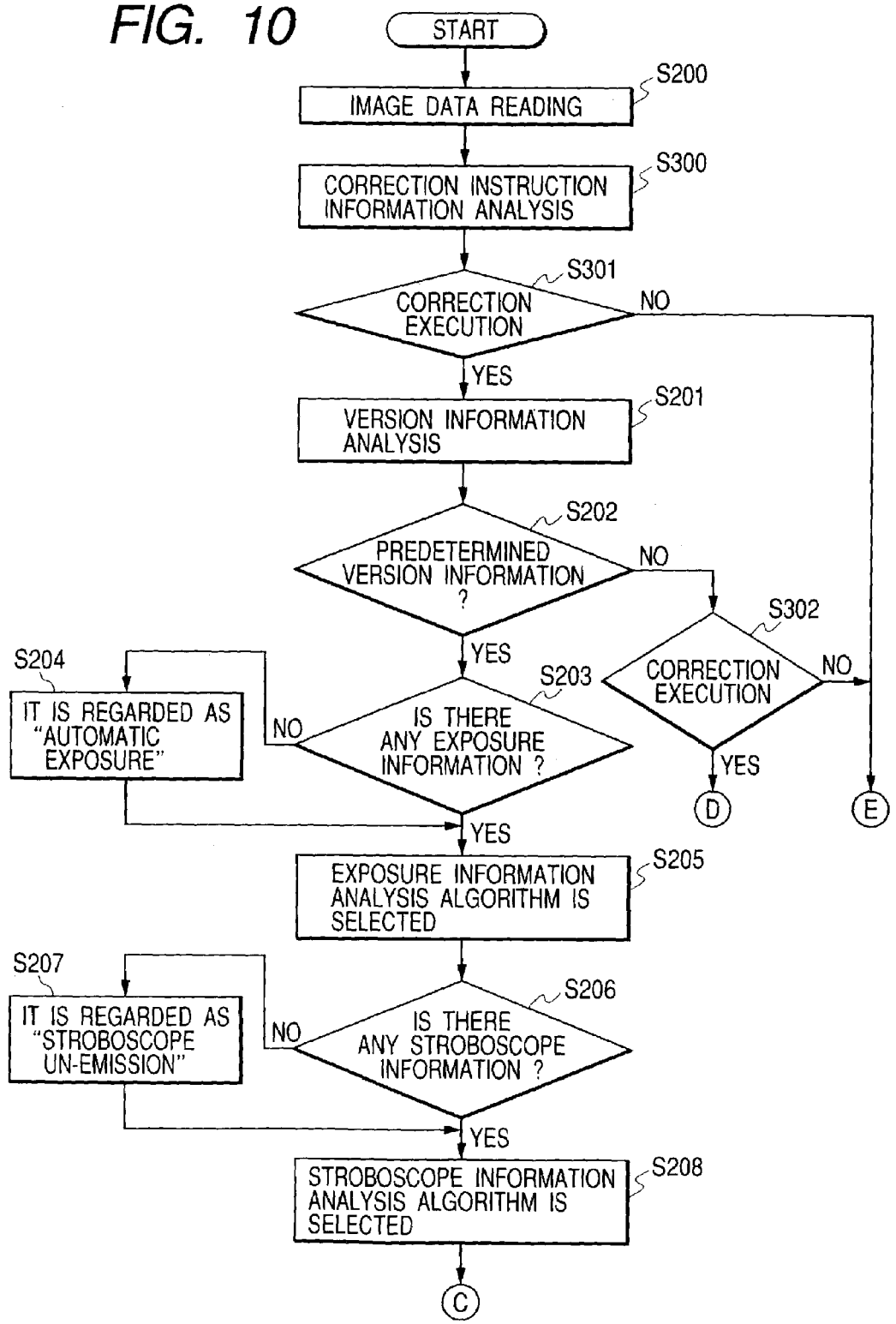
FIG. 10 is a flow chart for illustrating a part of the operation of an image processing apparatus in the third embodiment.
Figure 11:
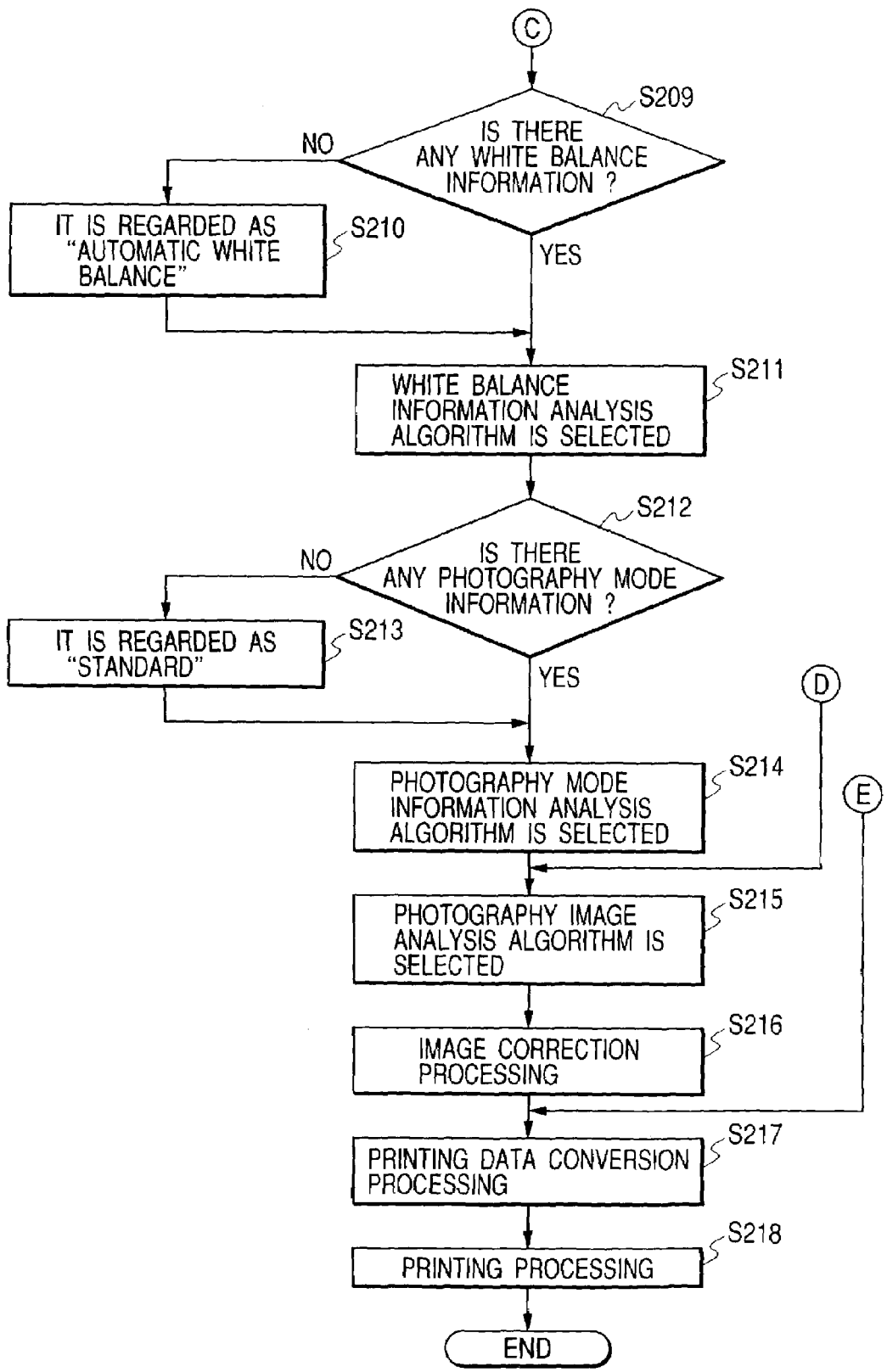
FIG. 11 is a flow chart for illustrating the other part of the operation of the image processing apparatus in the third embodiment.

FIGS. 10 and 11 show the operations of the image processing apparatus 108 shown in FIG. 8 in the present embodiment by means of flow charts.

Incidentally, in the flow charts of FIGS. 10 and 11, the steps where processing is executed similarly in the steps in the flow charts shown in FIGS. 6 and 7 (flow charts showing the operations of the image processing apparatus 108 in the second embodiment) are designated by the same reference marks as those in FIGS. 6 and 7, and the detailed descriptions of the steps are omitted.

The present embodiment is configured to add each processing at Steps S300, S301 and S302 to the operations of the second embodiment.

Step S300:

First, the reader unit 109 reads image data 116 therein similarly in the second embodiment (Step S200). Then, the instruction information analysis unit 203 analyzes the instruction information of the correction mode instruction unit 202 in the user interface 201.

Step S301:

If the analysis result of the instruction information analysis unit 203 indicates the operation of "executing the automatic image correction", then the operation of the image processing apparatus 108 proceeds to Step S201. If the result indicates the operation of "not executing the automatic image correction", then the operation of the image processing apparatus 108 skips the image correction processes, and proceeds to Step S217.

Step S302:

At Step S201, the data analysis unit 117 analyzes the format information (version information: here, "2") in the format information 105 of the image data 116 obtained by the reader unit 109 with the format analysis unit 110. At Step S202, if the analysis result of the format information indicates that the format analysis unit 110 judged the image data 116 not to have the format information equal to the predetermined format information (version information: here, "2"), then the operation of the image processing apparatus 108 proceeds to Step S302. At Step S302, if the analysis result of the correction information unit 203 does not indicate the operation of "executing only the correction of the file of version 2", then the operation of the image processing apparatus 108 proceeds to Step S215. If the analysis result indicates the operation of "executing only the correction of the file of version 2", then the operation of the image processing apparatus 108 skips the image correction processes to proceed to Step S217.

As described above, in the present embodiment described above, it is possible to select whether to execute the automatic image correction or not on the basis of the analysis result of the instruction information analysis unit 203 analyzed on the basis of the instruction information of the correction mode instruction unit 202 in the user interface 201. Furthermore, it is also possible to select to execute the automatic image correction only of the data of a specific version.

According to the present embodiment described above, it is possible to realize the highly precise automatic image correction processing using the photography image data 107 and the photography condition data 106 being the additional information indicating the photography conditions of the photography image data 107 at the time of printing out the photography image data 107 just like the first and the second embodiments. Besides, since the options of the image correction have increased, it is possible to provide a high quality printout result (photographic image printing result) more highly reflecting the user's intention at the time of photography.

Fourth Embodiment

Figure 13:
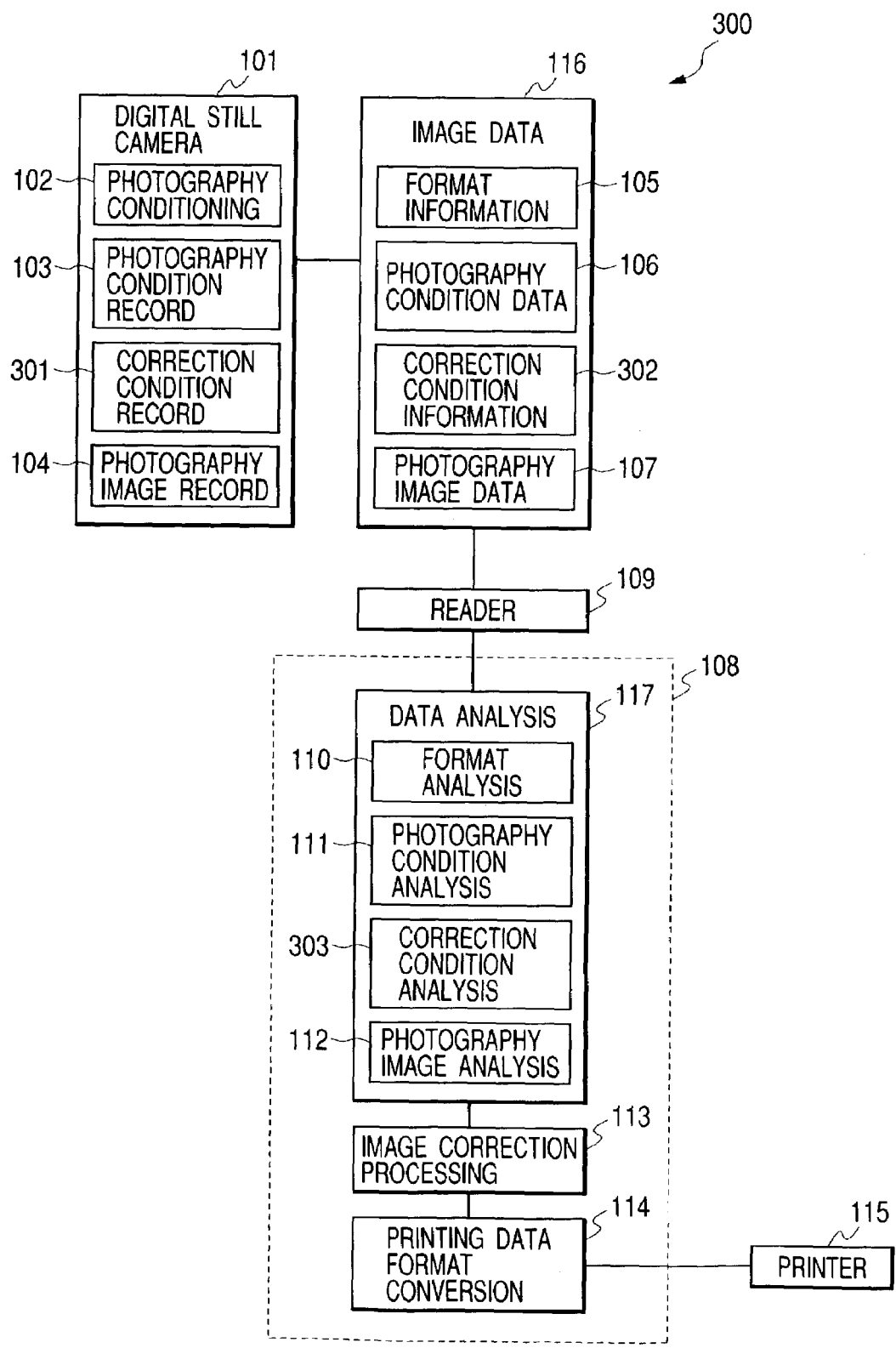
FIG. 13 is a block diagram showing the configuration of an image printing system as a fourth embodiment.

In the present embodiment, the present invention is applied to, for example, an image printing system 300 shown in FIG. 13.

The parts of the image printing system 300 of the present embodiment which execute similar processing to those of the image printing system 100 described in the preceding embodiments are designated by the same reference numerals as those in FIG. 1, and their detailed descriptions are omitted.

In the image printing system 300 of the present embodiment, a correction condition record unit 301 for recording correction conditions, correction condition information 302 and a correction condition analysis unit 303 are added to the image printing system 100 in the preceding embodiments.

The correction condition record unit 301 records the contents of the image correction processing and the amounts of the processing (e.g. the definition of a color space, contrast, color saturation, brightness, sharpness, noise reduction and the like) performed at the time of printing by the printer 115 into the correction condition information 302 in the image data 116 (data for being output to the image processing apparatus 108).

As the contents of the image correction processing and the amount of the processing, which are to be recorded in the correction condition information 302, the image correction conditions under which the optimum image quality as print-out results can be obtained are determined previously in consideration of the characteristics of the digital still camera 101. Thus, the correction condition record unit 301 can record the suitable contents of the image correction processing and the amount of the processing according to various photography conditions.

The correction condition analysis unit 303 analyzes the correction condition information 302 included in the image data 116, and selects the corresponding image correction algorithm on the basis of the analysis result of the correction condition information 302.

Figure 14:
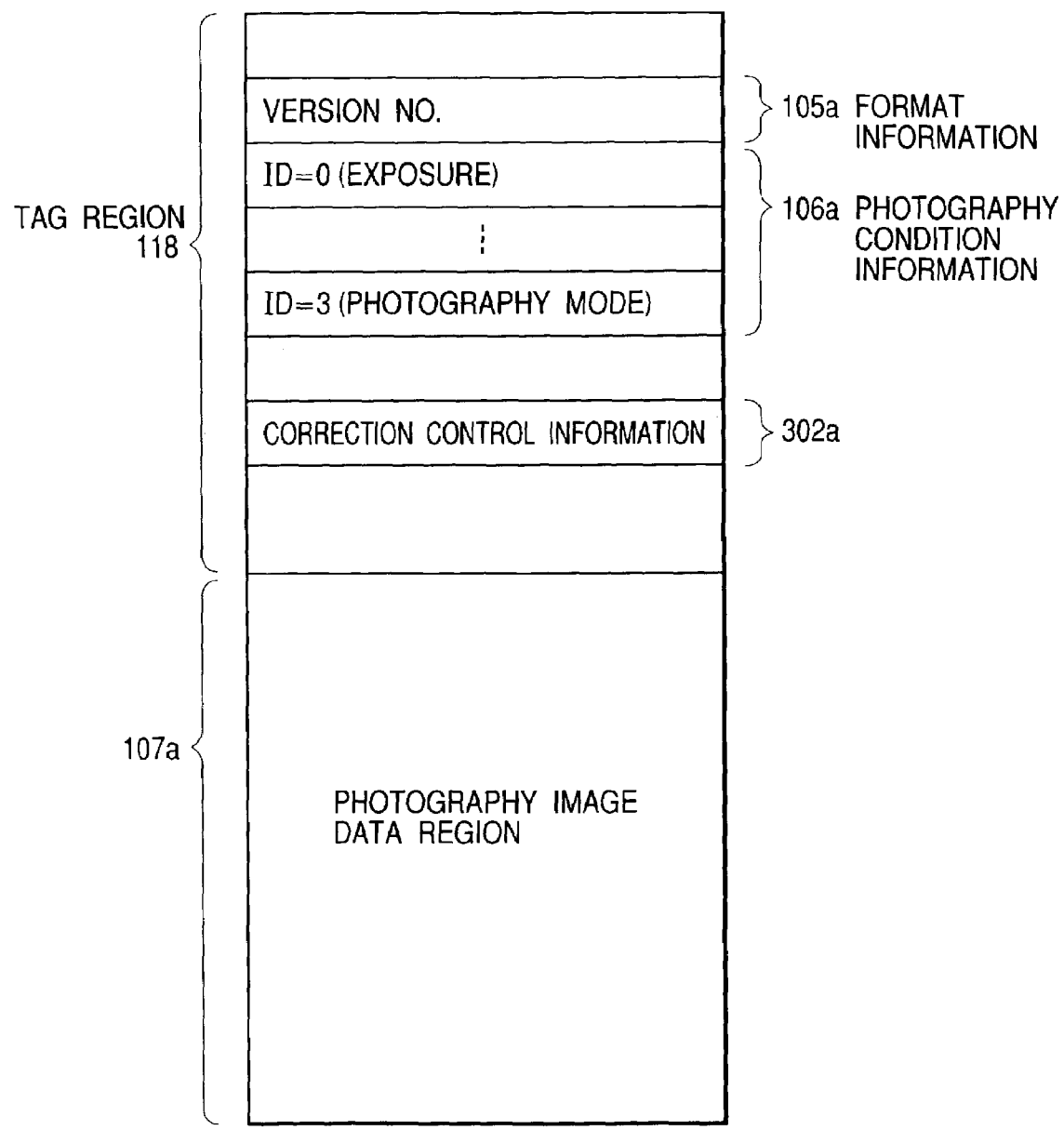
FIG. 14 is a view for illustrating a recording state of image data in an image processing apparatus in the fourth embodiment.

In the present embodiment, descriptions are given to the processing in the case where the format data shown in FIG. 14, for example, is adopted by the image printing system 300 shown in FIG. 13 in place of the pieces of the format data described relative to the preceding embodiments.

The image data 116 shown in FIG. 14 is similar to the image data 116 described above. The image data 116 shown in FIG. 14 is composed of a tag region 118 and a photography image data region 107a. The tag region 118 includes a format information (version information) region 105a, a photography condition data region 106a and a correction condition information region 302a. The format information region 105a is a recording region of the format information (version information) 105. The photography condition data region 106a is a recording region of the photography condition data 106. The correction condition information region 302a is a recording region of the correction condition information 302. The photography image data region 107a is a recording region of the photography image data 107.

As described above, the image data 116 may be compressed data or non-compressed data. Moreover, the image data 116 may be partially compressed. For example, the format information (version information) 105, the photography condition data 106 and the correction condition information 302 of the image data 116 may be uncompressed, and the photography image data 107 may be compressed.

Moreover, RGB data or YCC (brightness and color difference) data may be used as the photography image data 107. For example, if the YCC data is used as the photography image data 107, then the reader unit 109 of the image processing apparatus 108 converts the YCC data to RGB data.

The format information (version information) 105, the photography condition data 106 and the correction condition data 303 are recorded at positions distant by predetermined data offsets from the front position of the tag region 118 of the image data 116. Moreover, the photography condition data 106 (photography condition information of the digital still camera 101) is composed of the data related to photography conditions and the data related to the processing and the amount of processing which have been performed in the digital still camera 101. The photography conditions are ones concerning exposure, a stroboscope, a white balance, a photography mode and the like. The processing and the amount of the processing are ones concerning the definition of color space, contrast, color saturation, sharpness, the sensitivity of a CCD (the increase of the sensitivity increases the possibility of the generation of noises in a photography image) and the like. The photography data 106 has a data format capable of being commonly owned by both of the digital still camera 101 on the data input side and the printer 115 on the data output side.

The description format of the photography condition data 106 is the same as that described with respect to the preceding embodiments. Accordingly, the detailed descriptions of the description format are omitted here.

The correction condition information 302 is the information describing the image correction conditions applied at the time when the printer 115 on the data output side executes printing. The correction condition information 302 describes the data of the definition of color space, contrast, color saturation, brightness, sharpness, noise reduction and the like. The correction condition information 302 may describe the amounts of the processing of the concrete processing described above. In another case, for example, the pieces of processing at various photography modes may previously be defined as preset numbers, and the correction condition information 302 may describe the numbers.

The format information (version information) 105 concretely contains version numbers or marks just like the preceding embodiments.

Figure 15:
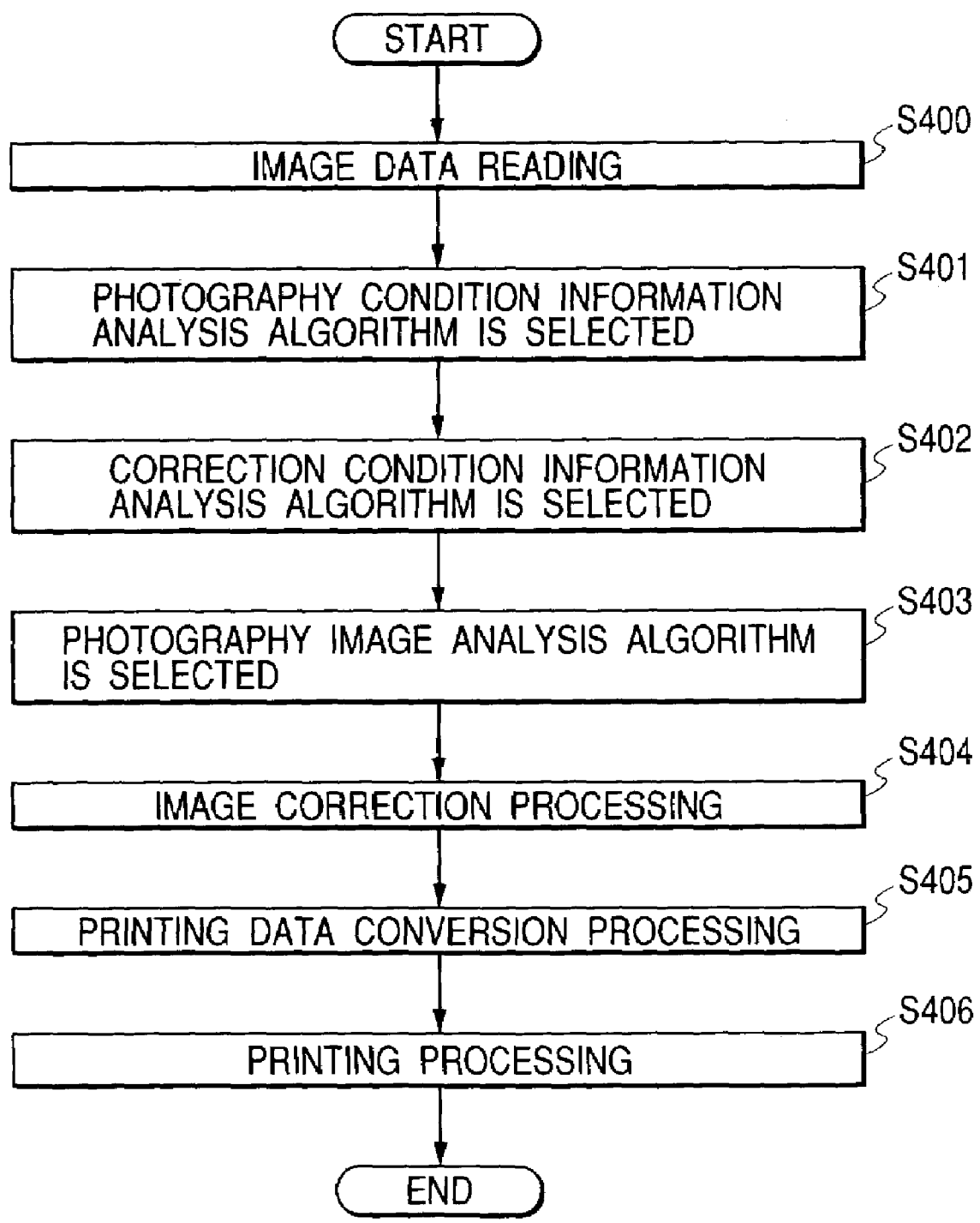
FIG. 15 is a flow chart for illustrating a part of the operation of the image processing apparatus in the fourth embodiment.

FIG. 15 shows the operation of the image processing apparatus 108 shown in FIG. 13 as a flow chart.

Step S400:
The reader unit 109 reads image data 116 therein.

Step S401:
The data analysis unit 117 analyzes the photography condition data 106 of the image data 116 obtained by the reader unit 109 with the format condition analysis unit 111, and selects an image correction algorithm for performing the image correction of the photography image data 107 on the basis of the analysis result.

Step S402:
The data analysis unit 117 analyzes the correction condition information 302 obtained by the reader unit 109 with the correction condition analysis unit 303, and selects an image correction algorithm for performing the image correction of the photography image data 107 on the basis of the correction result on photography conditions and the analysis result of the correction condition information 302 at Step S401.

Step S403:
The data analysis unit 117 selects an image correction algorithm for making the photography image data 107 of the image data 116 obtained by the reader unit 109 be in the optimum condition at the time of printing out the photography image data 107 with the photography image analysis unit 112.

The selection of the image correction algorithm is here executed in consideration of the image correction algorithms selected at each of the Steps S401 and S402.

Step S404:

The image correction processing unit 113 executes the image correction processing of the photography image data 107 in conformity with the image correction algorithms selected by the data analysis unit 117 at the Steps S401 to S403.

Step S405:

The printing data format conversion unit 114 converts the photography image data 107 after being processed by the image correction processing unit 113 into the data in the format capable of being printed by the printer 115.

Step S406:

The printer 115 prints out the photography image data 107 (data received the conversion processing of the printing data format conversion unit 114) processed by the image processing apparatus 108 in the way described above.

The processing shown by the flow chart described above uses the correction condition information 302 in addition to the photography image data 107 and, the photography condition data 106 being the additional information indicating the photography conditions of the photography image data 107, both of which have been described related to the preceding embodiments. Thereby, it is possible to realize the highly precise automatic image correction processing.

The correction condition information 302 has a very high correlation with the photography condition data 106. Consequently, there happens a case where the correction condition information 302 is described to the same factor as one to which the photography condition data 106 is described owing to an alteration of the format of the image data 116, or the like.

The correction condition information 302 indicates the contents of image correction and the amount thereof at the time of printing out in consideration of the characteristics and the like of the digital still camera 101. On the other hand, the photography condition data 106 indicates various photography conditions and the contents of the image corrections and the amounts of the corrections which have been performed in the digital still camera 101.

Consequently, if the description contents to the same factor are different from each other, or if the correction condition information 302 and the photography condition data 106 are independently interpreted, then there is a case where image corrections are doubly performed or conflicting image corrections are performed. Consequently, there is the possibility that these cases generate a primary factor of the deterioration of the image quality of printout images.

Moreover, in the following, an example of the process control method of the present embodiment is shown. The example is the case where the correction condition information 302 and the photography condition data 106 have severally a description to the same factor.

Figure 16:
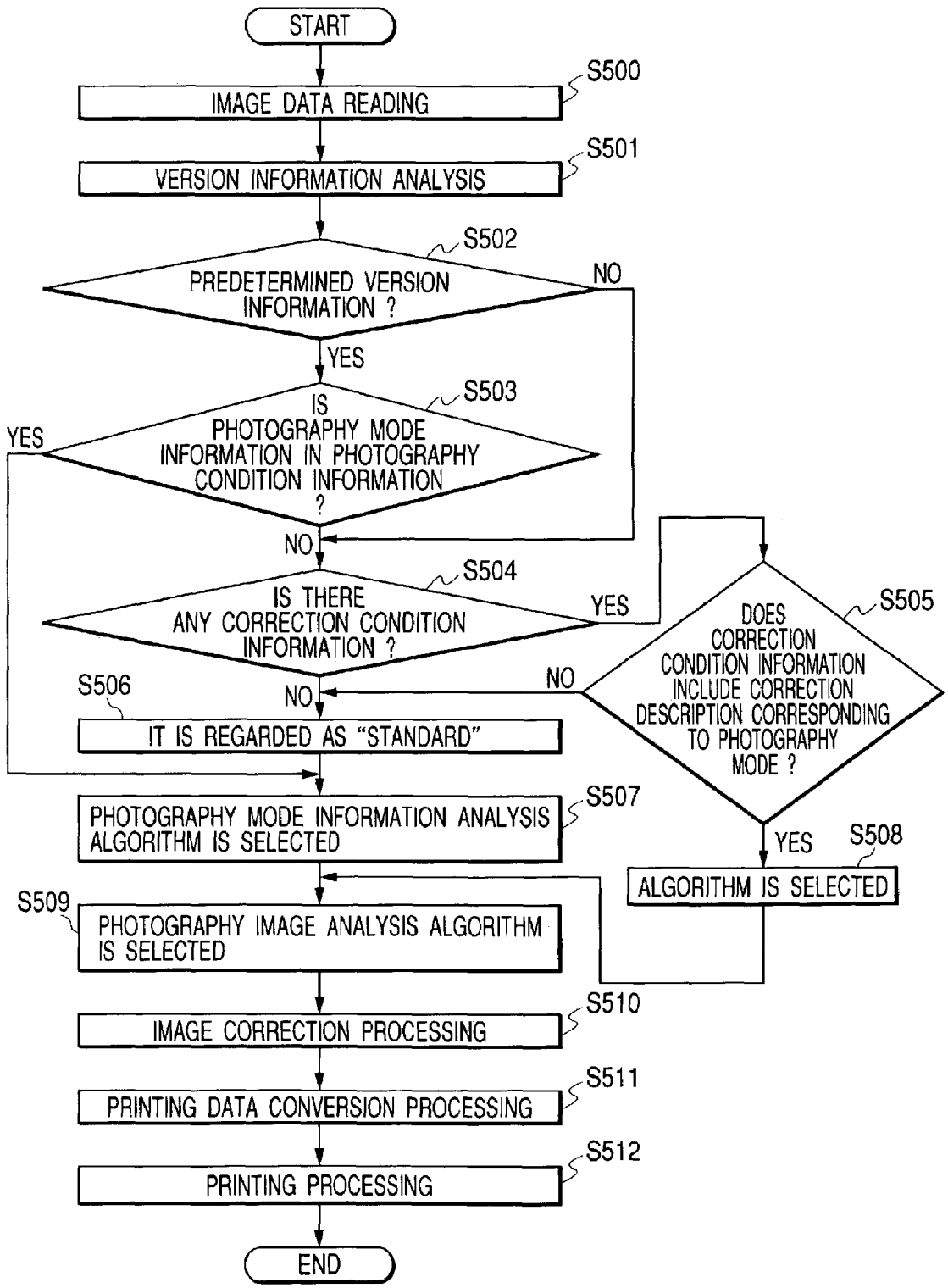
FIG. 16 is a flow chart for illustrating the other part of the operation of the image processing apparatus in the fourth embodiment.

FIG. 16 shows the operation of the image processing apparatus 108 as a flow chart in the case where the photography condition data 106 and the correction condition information 302 have severally a description to the same factor.

To put it concretely, descriptions will be given to the processing example for analyzing the photography mode information (for example, the person mode, the scenery mode, a night view mode and the like) and image correction information recorded according to the photography modes to select an image correction algorithm suitably in the case where the photography mode exists as the same factor.

Step S500:

The reader unit 109 reads image data 116 therein.

Step S501:

The data analysis unit 117 analyzes the format information (version information) in the format information 105 of the image data 116 obtained by the reader unit 109 with the format analysis unit 110.

Step S502:

If the format analysis unit 110 judges that the format information is equal to the predetermined format information (version information; here, it is judged whether the version information is "2" or not as the version at which the photography mode information should be recorded), then the operation of the image processing apparatus 108 proceeds to Step S503. If the format analysis unit 110 judges that the format information is not equal to the predetermined format information (version information: here "2"), then the operation of the image processing apparatus 108 skips the Step S503 to proceed to Step S504.

Step S503:

The data analysis unit 117 analyzes the existence of the information ID=3 (photography mode information) in the photography condition data 106 of the image data 116 obtained by the reader unit 109 with the photography condition analysis unit 111. If the information ID=3 (photography mode information) exists, then the operation of the image processing apparatus 108 skips Steps 504 and 506 to proceed to Step S507. If the information ID=3 does not exist, the operation of the image processing apparatus 108 proceeds to the Step S504.

Step S504:

The data analysis unit 117 analyzes the existence of the description of the correction condition information 302 in the image data 116 obtained by the reader unit 109 with the correction condition analysis unit 303. If the description of the correction condition information 302 exists, then the operation of the image processing apparatus 108 proceeds to Step S505. If the description of the correction condition information 302 does not exist, then the operation of the image processing apparatus 108 proceeds to the Step S506.

Step S505:

The data analysis unit 117 analyzes the existence of the description of a correction condition corresponding to a photography condition in the correction condition information 302 of the image data 116 obtained by the reader unit 109 with the correction condition analysis unit 303. If the description of the correction condition corresponding to the photography mode exists in the correction condition information 302, then the operation of the image processing apparatus 108 proceeds to Step S508. If the description of the correction condition corresponding to the photography mode does not exist in the correction condition information 302, then the operation of the image processing apparatus 108 proceeds to the Step S506.

Step S506:

Since the information ID=3 (photography mode information) of the photography condition data 106 does not exist, the data analysis unit 117 cannot perform any actual analysis at the next Step S507. Accordingly, the data analysis unit 117 sets the photography mode information to the "standard" mode.

Step S507:

The data analysis unit 117 analyzes the information ID=3 (photography mode information) in the photography condition data 106 of the image data 116 obtained by the reader unit 109 with the photography condition analysis unit 111, and selects an image correction algorithm for performing the image correction of the photography image data 107 on the basis of the analysis result.

Step S508:

The data analysis unit 117 analyzes the description of the correction condition corresponding to the photography mode in the correction condition data 302 of the image data 116 obtained by the reader unit 109 with the correction condition analysis unit 303, and selects an image correction algorithm for performing the image correction of the photography image data 107 on the basis of the analysis result. The pieces of processing to every various photography mode may previously be defined as preset numbers. And if one of the preset numbers is described, then the data analysis unit 117 may select the image correction algorithm corresponding to the described number.

Step S509:

The data analysis unit 117 selects an image correction algorithm with the photography image analysis unit 112. In accordance to the selected image correction algorithm, the photography image data 107 of the photography data 116 obtained by the reader unit 109 takes its optimum condition at the time of being printed out.

The selection of the image correction algorithm here is executed in consideration of the image correction algorithms selected at each of the Steps S501 to S508.

Step S510:

The image correction processing unit 113 executes the image correction processing of the photography image data 107 in conformity with the image correction algorithms selected by the data analysis unit 117 at the Steps S501 to S509.

Step S511:

The printing data format conversion unit 114 converts the photography image data 107 after being processed by the image correction processing unit 113 into the data in the format capable of being printed by the printer 115.

Step S512:

The printer 115 prints out the photography image data 107 (data received the conversion processing of the printing data format conversion unit 114) processed by the image processing apparatus 108 in the way described above.

According to the present embodiment described above, it is possible to embody the highly precise automatic image correction processing using the photography image data 107, the photography condition data 106 being the additional information indicating the photography conditions of the photography image data 107, and the-correction condition information 302 at the time of printing out the photography image data 107. Thereby, it is possible to provide a high quality printout result (photographic image printing result) which highly reflects the user's intention at the time of photography.

Moreover, if the photography condition data 106 and the correction condition information 302 severally have a description to the same factor (photography mode in the present embodiment), then the embodiment determines the priority order to use which data or information. Thereby, it is possible to prevent the image deterioration of printout images to be caused by a double image correction or a conflicting image correction at the time of the independent interpretation of the photography condition data 106 and the correction condition information 302. Consequently, it is possible to select an image correction algorithm suitably.

In the present embodiment, the information of a photography mode is adopted prior to the correction information. However, the priority may be reverse. By setting such priorities, it is possible to escape the performance of duplicate corrections. It can be designed freely which information is made to take preference. However, if the priority is switched according to the version information of the recording format of correction information, it would be effective.

For example, the correction information of a new version would be pertinent correction information based on a highly developed analysis. Accordingly, if the version of a piece of correction information is newer than a predetermined version, then it would be better to put the priority on the correction information itself to the information at the time of photography.

Incidentally, the photography condition data 106 is not limited to the examples described above. Any information may be used as the photography condition data 106 as long as the information can specify the intention of a user at the time of photography and a photography scene. Moreover, for example, the information or the like indicating the characteristics at the time of acquiring a photography image is capable of being adopted as the photography condition data 106. Furthermore, the information including a plurality of factors may certainly be adopted.

Moreover, also the correction condition information 302 is not limited to the examples described above. Any description may be used as the correction condition information 302 as long as the description describes the contents of the concrete correction processing and the amount of the correction which are performed by the image correction processing unit 113. Moreover, a plurality of preset conditions to a plurality of processing contents and the amounts of the correction may be prepared in advance, and then the correction condition information 302 may indicate a number of the preset conditions. Furthermore, the information including a plurality of factors may certainly be adopted as the correction condition information 302.

Furthermore, the contents of the image correction processing executed on the basis of the analysis result of the photography condition data 106 and the correction condition information 302 may be sufficient if only the contents are the optimum image correction processing according to the characteristics and the like of the printer 115 to be used for printing out. Thus, the image correction processing is not limited to the processing described above.

Moreover, the present invention is not limited to the present embodiment, and can be embodied by being variously changed within the subject matter of the present invention.

The present invention is not limited to the first to the fourth embodiments, and can be embodied by being variously changed within the subject matter of the present invention.

Moreover, the first to the fourth embodiments are configured to use a digital still camera as an example of the input unit (acquisition unit) of an image. However, the input unit is not limited to the digital still camera. For example, input equipment such as a digital video camera, an image scanner, a film scanner and the like can be used as the input unit.

Moreover, it is needless to say that the objects of the present invention can be achieved by providing a storage medium in which program codes of the software realizing the functions of the host and the terminals of the first to the fourth embodiments to the system or the apparatus, and by making the computer (central processing unit (CPU) or micro processing unit (MPU)) of the system or the apparatus read the program codes stored in the storage medium to execute them.

In this case, the program codes themselves realize the functions of the first to the fourth embodiments. The storage medium storing the program codes and the program codes themselves constitute the present invention.

As the storage medium to store the program codes, a read only memory (ROM), a flexible disk, a hard disk, an optical disk, a magneto-optical disk, a compact disc read-only memory (CD-ROM), a compact disc-recordable (CD-R), a magnetic tape, a nonvolatile memory card and the like can be used.

It is needless to say that the present invention includes not only the case where the functions of the first to the fourth embodiments are realized by the execution of the program codes read by the computer, but also the case where the functions of the first to the fourth embodiments are realized by a part or the whole of the actual processing executed by an operating system (OS) or the like operating on the computer on the basis of the instructions of the program codes.

Furthermore, after a program code read from a storage medium has been written into a memory installed in an expansion function board inserted into the computer or from a memory connected to a function expanding unit connected to the computer, a CPU or the like equipped in the expansion function board or the function expanding unit may execute a part or the whole of the actual processing to realize the functions of the first to the fourth embodiments by the processing of the CPU or the like. Such a case is certainly be included into the scope of the present invention.

Figure 12:
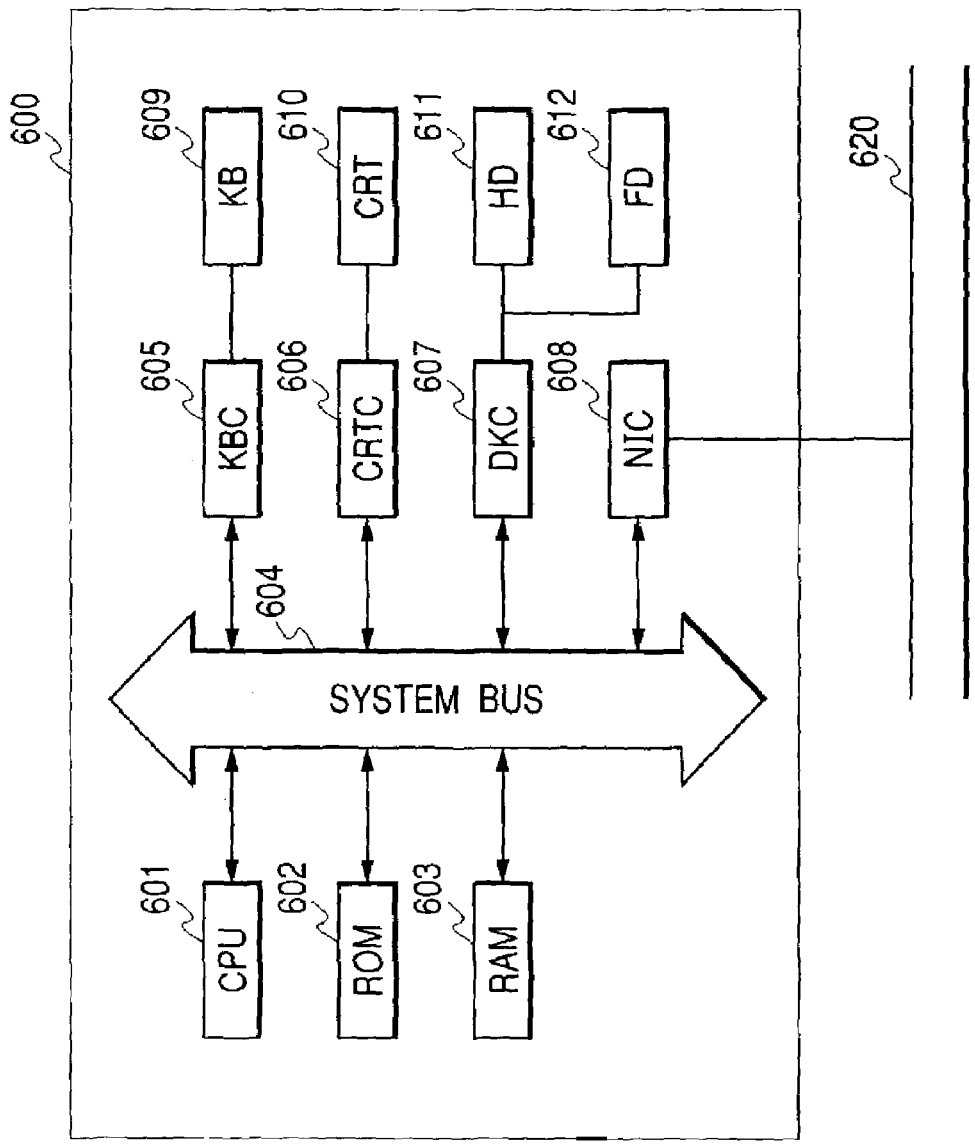
FIG. 12 is a block diagram showing the configuration of a computer for executing a program for operating the computer to realize the functions of the image printing system by reading the program from a computer readable storage medium.

FIG. 12 shows the functions 600 of the computer.

The computer functions 600 are configured to connecting the following functions to each other through a system bus 604 as shown in FIG. 12 in the state in which the functions can communicate with each other. The functions are a CPU 601, a ROM 602, a random access memory (RAM) 603, a keyboard controller (KBC) 605 of a keyboard (KB) 609, a cathode ray tube controller (CRTC) 606 of a cathode ray tube (CRT) display 610 as a display unit, a disk controller (DKC) 607 of a hard disk (HD) 611 and a flexible disk (FD) 612, and a network interface controller (NIC) 608 for the connection to a network 620.

The CPU 601 executes the software stored in the ROM 602 or the HD 611 or the software supplied from the FD 612 to control each constituent unit connected to the system bus 604 collectively.

That is, the CPU 601 reads a processing program in accordance with a predetermined processing sequence from the ROM 602, the HD 611 or the FD 612 to execute the read processing program. Thereby the CPU 601 performs the control for realizing the operations of the present embodiment.

The RAM 603 functions as a main memory or a work area of the CPU 601.

The KBC 605 controls instruction inputs from the KB 609, a pointing device (not shown) or the like.

The CRTC 606 controls the display of the CRT 610.

The DKC 607 controls the access to the HD 611 and the FD 612 which store a boot program, various applications, editing files, user files, network management programs, a predetermined processing programs in the present embodiment, and the like.

The NIC 608 interactively exchanges data with apparatus or systems on the network 620.

As described above, the present invention analyzes the format information (version information) added to the image information (image information and the like photographed by a digital still camera) of a processing object. Then, the invention changes the analysis method of the condition information (photography condition information and the like) added to the image information of the processing object. In another case, the invention uses previously determined conditions as the analysis results, and performs the image processing (image correction processing and the like) of the image information on the basis of the analysis results. The present invention is configured as above.

Consequently, it is possible to perform the image processing in consideration of the situations at the time of obtaining respective images of image data having a different description format of condition information, image data having condition information different in the number of items of added condition information, and image data having a different meaning of the description content in the same condition item in condition information. Thereby, it becomes possible to provide a good processed image which a user has intended.

As described above, the invention can realize a highly precise automatic image correction by means of the information indicating the conditions at the time of obtaining image information. And, it also becomes possible to provide a high quality processed image reflecting the intention of the user at the time of photography much more.

Furthermore, according to the present invention, a more pertinent image correction can be performed in the case where image data has both records of attribute information added to the image data at the time of photography for an image correction, and image correction information which has previously recorded related to image data.

The present invention is not limited to the embodiments described above, and various changes can be made within a scope of the invention indicated by the following claims.

What is claimed is:

1. An image processing apparatus for performing image processing of image information including image data and condition information at a time of obtaining said image data, said apparatus comprising:
 a first analysis unit for analyzing a description format of said condition information;
 a second analysis unit for analyzing said condition information on the basis of an analysis result of said first analysis unit; and
 a processing determination unit for determining said image processing of said image data on a basis of an analysis result of said second analysis unit,
 wherein said second analysis unit changes an item of said condition information to be analyzed for determining image processing of the image data, in accordance with the description format of said condition information analyzed by said first analysis unit.

2. An image processing apparatus according to claim 1, wherein said processing determination unit determines an image correction algorithm as said image processing.

3. An image processing apparatus according to claim 1, wherein said processing determination unit changes an analysis method of said second analysis unit according to said description format analyzed by said first analysis unit.

4. An image processing apparatus according to claim 1, wherein said processing determination unit determines an image correction algorithm of said image processing on a basis of a previously determined processing condition in a case where said condition information being an object of said second analysis unit does not exist.

5. An image processing apparatus according to claim 1, wherein said image information is image information obtained with a digital still camera, and
wherein said condition information includes version information of said description format and further includes at least one piece of information related to exposure, a stroboscope, a white balance, and a photometry mode at the time of obtaining said image information.

6. An image processing apparatus according to claim 1, wherein said processing determination unit has a function of analyzing said image data, and said processing determination unit determines a content of said image processing on a basis of an analysis result of said image data and analysis results of said first and said second analysis units.

7. An image processing apparatus according to claim 1, wherein said second analysis unit changes meaning of a value of said condition information to be analyzed, in according to the analysis result of said first analysis unit.

8. An image processing apparatus according to claim 1, further comprising:
an image processing unit for performing said image processing determined by said processing determination unit, on said image data; and
a printing unit for printing an image on the basis of the image data subjected to said image processing by said image processing unit.

9. An image processing apparatus according to claim 1, wherein said condition information is information recorded by an external apparatus.

10. An image processing method for performing image correction processing of image information including image data and condition information at a time of obtaining said image data, said method comprising:
a first analysis step of analyzing a description format of said condition information;
a second analysis step of analyzing said condition information on the basis of an analysis result in said first analysis step; and
an image correction condition determination step of determining a condition of said image correction processing on a basis of an analysis result in said second analysis steps,
wherein said second analysis step includes changing an item of said condition information to be analyzed for determining image processing of the image data, in accordance with the description format of said condition information analyzed in said first analysis step.

11. An image processing method according to claim 10, wherein at said image correction condition determination step, a determination condition of said condition of said image correction processing as said image correction processing is changed according to said description format analyzed in said first analysis step.

12. An image processing method according to claim 10, wherein at said image correction condition determination step, an analysis method of said second analysis step is changed according to said description format analyzed in said first analysis step.

13. An image processing method according to claim 12, wherein in said image correction condition determination step, said condition of said image correction processing as said image correction processing is determined on a basis of a previously determined processing condition in a case where said condition information being an object in said second analysis step does not exist.

14. A computer-readable storage medium storing a computer program for causing a computer to execute said image processing method according to claim 10.

15. An image processing apparatus for performing image processing of image information including image data and condition information at a time of obtaining said image data and image correction information at a time of outputting said image data, said apparatus comprising:
a first analysis unit for analyzing version information of said condition information;
a second analysis unit adapted to analyze said condition information and said image correction information; and
a determination unit for determining which image processing is to be performed, said image processing using said condition information or said image processing using said image correction information, in accordance with the version information analyzed by said first analysis unit.

16. An image processing apparatus according to claim 15, wherein said first analysis unit further analyzes a description format of said image correction information.

17. An image processing apparatus according to claim 15, further comprising:
an input unit for inputting image data from a detachably mounted storage medium, said input unit inputting said condition information and said image correction information stored in said storage medium relatively to said image data.

18. An image processing apparatus according to claim 15, further comprising:
an image processing unit for performing said image processing determined by said determination unit, on said image data; and
a printing unit for printing an image on the basis of the image data subjected to said image processing by said image processing unit.

19. An image processing apparatus according to claim 15, wherein each of said condition information and said image correction information is information recorded by an external apparatus.

20. An image processing method for performing image processing of image information including image data and condition information at a time of obtaining said image data and image correction information at a time of outputting the said image data, said method comprising:
a first analysis step of analyzing version information of said condition information;
a second analysis step of analyzing said condition information and said image correction information; and
a determination step of determining which image processing is to be performed, said image processing using said condition information or said image processing using said image correction information, in accordance with the version information analyzed in said first analysis step.

21. A computer-readable storage medium storing a computer program for causing a computer to execute said image processing method according to claim 20.

22. An image processing apparatus for performing image processing of image information including image data, condition information at a time of obtaining the image data, and image correction information at a time of outputting the image data, said apparatus comprising:
- a first analysis unit for analyzing version information of said image correction information;
- a second analysis unit adapted to analyze said condition information or said image correction information; and
- a determination unit for determining which image processing is to be performed, said image processing using said condition information or said image processing using said image correction information, in accordance with the version information analyzed by said first analysis unit.

23. An image processing apparatus according to claim 22, further comprising:
- an image processing unit for performing said image processing determined by said determination unit, on said image data; and
- a printing unit for printing an image on the basis of the image data subjected to said image processing by said image processing unit.

24. An image processing apparatus according to claim 22, wherein each of said condition information and said image correction information is information recorded by an external apparatus.

* * * * *

UNITED STATES PATENT AND TRADEMARK OFFICE
CERTIFICATE OF CORRECTION

| | |
|---|---|
| PATENT NO. | : 7,369,163 B2 |
| APPLICATION NO. | : 10/383720 |
| DATED | : May 6, 2008 |
| INVENTOR(S) | : Yuji Akiyama et al. |

It is certified that error appears in the above-identified patent and that said Letters Patent is hereby corrected as shown below:

COLUMN 1:

Line 21, "treated" should read --been treated--;
Line 34, "to develop" should read --development of--;
Line 44, "proposed" should read --been proposed--; and
Line 53, "corrections" should read --correction--.

COLUMN 2:

Line 46, "which" should read --whether--;
Line 49, "considerable" should read --possible--;
Line 54, "be" should read --been--;
Line 61, "heighten" should read --heightening--; and
Line 62, "change" should read --changing--.

COLUMN 3:

Line 2, "to make the corrected image be deterior" should read --and deteriorate the corrected image.--;
Line 3, "rated." should be deleted; and
Line 24, "considerable" should read --possible--.

COLUMN 4:

Line 58, "reflecting" should read --reflects--.

COLUMN 11:

Line 61, "to" should read --for--.

COLUMN 12:

Line 30, "to" should read --of--; and
Line 48, "performed" should read --given--.

COLUMN 17:

Line 67, "in" (first occurrence) should read --to--.

UNITED STATES PATENT AND TRADEMARK OFFICE
CERTIFICATE OF CORRECTION

PATENT NO. : 7,369,163 B2
APPLICATION NO. : 10/383720
DATED : May 6, 2008
INVENTOR(S) : Yuji Akiyama et al.

It is certified that error appears in the above-identified patent and that said Letters Patent is hereby corrected as shown below:

COLUMN 18:

Line 46, "embodiment described" should read --embodiment,--;
    Line 47, "above," should be deleted; and
    Line 62, "like" should read --as in--.

COLUMN 21:

Line 35, "happens" should read --occurs--;
    Line 61, "to" should read --of--; and
    Line 65, "to" should read --of--.

COLUMN 23:

Line 21, "to every various photography mode" should read --plurality of photography modes--;
    Line 59, "the-correction" should read --the correction--; and
    Line 67, "to" should read --of--.

COLUMN 24:

Line 34, "also" should be deleted.

COLUMN 25:

Line 5, "realizing" should read --realize--;
    Line 39, "is" should read --will--; and
    Line 42, "connecting" should read --connect--.

UNITED STATES PATENT AND TRADEMARK OFFICE
CERTIFICATE OF CORRECTION

| | | |
|---|---|---|
| PATENT NO. | : 7,369,163 B2 | |
| APPLICATION NO. | : 10/383720 | |
| DATED | : May 6, 2008 | |
| INVENTOR(S) | : Yuji Akiyama et al. | |

It is certified that error appears in the above-identified patent and that said Letters Patent is hereby corrected as shown below:

COLUMN 26:

Line 4, "programs" should read --program--.

Signed and Sealed this

Twenty-first Day of October, 2008

JON W. DUDAS
*Director of the United States Patent and Trademark Office*